United States Patent
Spinelli et al.

(10) Patent No.: US 9,846,921 B2
(45) Date of Patent: Dec. 19, 2017

(54) DYNAMIC IMAGE MASKING SYSTEM AND METHOD

(71) Applicant: The Boeing Company, Chicago, IL (US)

(72) Inventors: Charles B. Spinelli, Anthem, AZ (US); Robert W. Turner, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 558 days.

(21) Appl. No.: 14/500,589

(22) Filed: Sep. 29, 2014

(65) Prior Publication Data
US 2017/0018058 A1    Jan. 19, 2017

(51) Int. Cl.
| | |
|---|---|
| B64C 39/02 | (2006.01) |
| B64D 47/08 | (2006.01) |
| G06K 9/00 | (2006.01) |
| G06T 5/00 | (2006.01) |
| G01S 17/02 | (2006.01) |
| G01S 17/89 | (2006.01) |
| G01S 15/02 | (2006.01) |
| G01S 13/86 | (2006.01) |
| G01S 13/89 | (2006.01) |

(Continued)

(52) U.S. Cl.
CPC ............ *G06T 5/002* (2013.01); *B64C 39/024* (2013.01); *B64D 47/08* (2013.01); *G01S 13/867* (2013.01); *G01S 13/89* (2013.01); *G01S 15/025* (2013.01); *G01S 15/89* (2013.01); *G01S 17/023* (2013.01); *G01S 17/89* (2013.01); *G06K 9/0063* (2013.01); *G08G 5/0069* (2013.01); *B64C 2201/123* (2013.01); *G06T 2207/10032* (2013.01); *G06T 2207/20004* (2013.01); *G09G 3/20* (2013.01); *G09G 2358/00* (2013.01); *G09G 2380/12* (2013.01)

(58) Field of Classification Search
CPC .................................................... G06T 5/002
USPC ......................................................... 348/144
See application file for complete search history.

(56) References Cited

U.S. PATENT DOCUMENTS

| | | | | |
|---|---|---|---|---|
| 7,019,777 | B2 * | 3/2006 | Sun ...................... | H04N 3/1593 348/262 |
| 8,266,333 | B1 * | 9/2012 | Wade ................... | H04N 19/436 710/14 |

(Continued)

*Primary Examiner* — Mohammed Rahaman
*Assistant Examiner* — Asmamaw G Tarko

(57) ABSTRACT

A dynamic image masking system for providing a filtered autonomous remote sensing image through a dynamic image masking process is provided. The dynamic image masking system has a remote sensing platform and an imaging system associated with the remote sensing platform. The imaging system has an optical system and an image sensing system. The dynamic image masking system further has a multi-level security system associated with the imaging system and one or more image alteration locations located in the imaging system and the multi-level security system, wherein alteration of one or more images takes place via the dynamic image masking process. The dynamic image masking system further has a computer system associated with the imaging system. The computer system has a gatekeeper algorithm configured to send gatekeeper commands to one or more controllers that control the one or more image alteration locations through the dynamic image masking process.

25 Claims, 9 Drawing Sheets

(51) Int. Cl.
    *G01S 15/89* (2006.01)
    *G08G 5/00* (2006.01)
    *G09G 3/20* (2006.01)

(56) References Cited

U.S. PATENT DOCUMENTS

| | | | |
|---|---|---|---|
| 8,731,234 B1* | 5/2014 | Ciarcia | G06K 9/00637 |
| | | | 382/100 |
| 9,086,484 B2* | 7/2015 | Medasani | G01S 7/412 |
| 2003/0183765 A1* | 10/2003 | Chen | G06K 9/3241 |
| | | | 250/330 |
| 2005/0007456 A1* | 1/2005 | Lee | H04M 1/72577 |
| | | | 348/207.99 |
| 2007/0235584 A1* | 10/2007 | Corman | H04L 67/125 |
| | | | 244/75.1 |
| 2009/0251534 A1* | 10/2009 | Fujimoto | B60R 11/04 |
| | | | 348/78 |
| 2011/0144828 A1 | 6/2011 | Chengalva | |
| 2012/0044476 A1* | 2/2012 | Earhart | G01S 3/7867 |
| | | | 356/4.01 |
| 2013/0073775 A1* | 3/2013 | Wade | H04N 7/181 |
| | | | 710/316 |
| 2013/0317667 A1* | 11/2013 | Kruglick | B64C 39/024 |
| | | | 701/2 |
| 2014/0119716 A1* | 5/2014 | Ohtomo | G01C 11/00 |
| | | | 396/8 |
| 2014/0140575 A1* | 5/2014 | Wolf | G06K 9/3233 |
| | | | 382/103 |
| 2014/0312165 A1* | 10/2014 | Mkrtchyan | B64D 47/08 |
| | | | 244/13 |
| 2014/0347482 A1* | 11/2014 | Weinmann | H04N 5/247 |
| | | | 348/144 |
| 2015/0168144 A1* | 6/2015 | Barton | G01C 11/02 |
| | | | 348/144 |
| 2015/0234102 A1* | 8/2015 | Kurzweg | G02B 13/0015 |
| | | | 348/360 |

* cited by examiner

DYNAMIC IMAGE MASKING SYSTEM AND METHOD

BACKGROUND

1) Field of the Disclosure

The disclosure relates generally to systems and methods for remote sensing image collection, and more particularly, to automated dynamic image masking systems and methods for remote sensing image collection, such as aerial remote sensing image collection.

2) Description of Related Art

Remote sensing, such as aerial remote sensing, involves the use of sensor and imaging technologies, such as radar imaging systems, camera imaging systems, light detection and ranging (LIDAR) systems, and other sensor and imaging systems, to obtain images of the ground and earth's surface and remote objects. Analog aerial photography, videography, and digital photography are commonly used in airborne remote sensing to collect images. Digital photography allows for real time transmission of the remotely sensed data to a ground or base station for immediate analysis, and the digital images may be analyzed and interpreted with the aid of a computer.

However, aerial remote sensing imagery collection may be tedious, and if the imaging system is not correctly oriented when an image capture event occurs, a large amount of minimally useful information may be produced as a result. For precision agricultural (PA) based aerial remote sensing missions that may collect images of agricultural fields and crops to determine plant health and vigor, an operator has to be able to handle large areas of land, a unique and well-known distribution of image collection sites, a well-defined flight profile in terms of range, time of flight, altitude, position, and speed, and distinct areas of image exclusion, the latter of which may hinder precision agricultural (PA) based aerial remote sensing operations substantially if not accounted for.

For example, when flying a precision agriculture based aerial remote sensing mission, an air vehicle, such as an unmanned aerial vehicle (UAV), may have ingress to a first farm by flying over other populated areas. It may be undesirable to commence imaging until in position over the first farm, so it is desirable for an autopilot of the UAV and the imaging system to be integrated and to allow for autonomous operations.

Known systems and methods for aerial remote sensing imagery collection may include flying under piloted control with the pilot located in the local field with a view of the entire acreage, and may thus not allow for autonomous operations, which may be preferred for a precision agricultural market. Moreover, without well defined collect zones, there may be too much land or area to image and the amount of collected image data may overwhelm the sensor and imaging system. Further, data may be inadvertently imaged and collected that is restricted or out of bounds and not in a defined collect zone.

In addition, known systems and methods for aerial remote sensing imagery collection may include manual operation shutter control that may be pre-programmed (every n seconds) or operator triggered. However, with such manual operation used with the precision agricultural market, one may need to ingress to a particular field that is designated to be imaged. This option may require flying beyond a line of sight to arrive at the proper destination, and particularly when flying at low altitudes, less than 400 feet above ground level. However, such option may be labor intensive, expensive, and may not yield the desired results to address the precision agricultural market.

Another option may be to have a live link from the imaging camera system to the ground controller (pilot and ground control station operator) that provides a bird's-eye view of the area. This may be used to alert the operators when it is time to maneuver and when it is time to take a photograph. However, this option may also be labor intensive and may not satisfy all the requirements for a precision agricultural mission.

Accordingly, there is a need in the art for an improved system and method for a dynamic image masking system for providing filtered autonomous remote sensing image through a dynamic image masking process and for providing a way to mask or alter pixels that are unwanted or extraneous to an image collection event or mission, such as a precision agricultural mission, that provide advantages over known systems and methods.

SUMMARY

Example implementations of the present disclosure provide an improved system and method for a dynamic image masking system that provides a filtered autonomous remote sensing image through a dynamic image masking process to overcome the limitations of existing solutions. As discussed in the below detailed description, embodiments of the improved system and method for a dynamic image masking system that provides a filtered autonomous remote sensing image through a dynamic image masking process may provide significant advantages over existing systems and methods.

In an embodiment of the disclosure, there is provided a dynamic image masking system for providing a filtered autonomous remote sensing image through a dynamic image masking process. The dynamic image masking system comprises a remote sensing platform.

The dynamic image masking system further comprises an imaging system associated with the remote sensing platform. The imaging system comprises an optical system and an image sensing system.

The dynamic image masking system further comprises a multi-level security system associated with the imaging system. The dynamic image masking system further comprises one or more image alteration locations located in the imaging system and the multi-level security system, wherein alteration of one or more images takes place via the dynamic image masking process.

The dynamic image masking system further comprises a computer system associated with the imaging system. The computer system comprises a gatekeeper algorithm configured to send gatekeeper commands to one or more controllers that control the one or more image alteration locations through the dynamic image masking process.

In another embodiment of the disclosure, there is provided a method for providing a filtered autonomous remote sensing image through a dynamic image masking process. The method comprises the step of equipping a remote sensing platform with an imaging system. The method further comprises the step of designating an area for imaging to obtain a designated area to be imaged. The method further comprises the step of establishing a plurality of datum points on a surface of the designated area to be imaged.

The method further comprises the step of designating a plurality of specific surface areas as excluded area not to be imaged with reference to the plurality of datum points. The method further comprises the step of controlling a pre-established collection planning process covering the designated area to be imaged.

The method further comprises the step of using a navigation system comprising a global positioning system (GPS), a radio based navigation system, an optical based navigation system, an inertial measurement unit (IMU) system, an inertial measurement unit (IMU) system equipped with a magnetometer, or a combination thereof, to position the imaging system to image the designated area to be imaged. The method further comprises the step of using the imaging system to image the designated area to be imaged that is covered by the pre-established collection planning process.

The method further comprises the step of dynamically nullifying one or more pixels in one or more images of the excluded area. The method further comprises the step of obtaining a filtered autonomous remote sensing image through dynamic image masking of the designated area to be imaged.

In another embodiment of the disclosure, there is provided a method for providing a filtered autonomous remote sensing image through a dynamic image masking process. The method comprises the step of equipping an unmanned aerial vehicle (UAV) with an imaging system. The method further comprises the step of designating an area for imaging to obtain a designated area to be imaged. The method further comprises the step of establishing a plurality of datum points on a surface of the designated area to be imaged.

The method further comprises the step of designating a plurality of specific surface areas as excluded area not to be imaged with reference to the plurality of datum points. The method further comprises the step of controlling a pre-established flight plan of the UAV covering the designated area to be imaged.

The method further comprises the step of using a navigation system comprising a global positioning system (GPS), a radio based navigation system, an optical based navigation system, an inertial measurement unit (IMU) system, an inertial measurement unit (IMU) system equipped with a magnetometer, or a combination thereof, to position the imaging system to image the designated area to be imaged. The method further comprises the step of flying the UAV over the designated area to be imaged, and using the imaging system to image the designated area to be imaged that is covered by the pre-established flight plan of the UAV.

The method further comprises the step of dynamically nullifying one or more pixels in one or more images of the excluded area. The method further comprises the step of obtaining a filtered autonomous remote sensing image through dynamic image masking of the designated area to be imaged.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
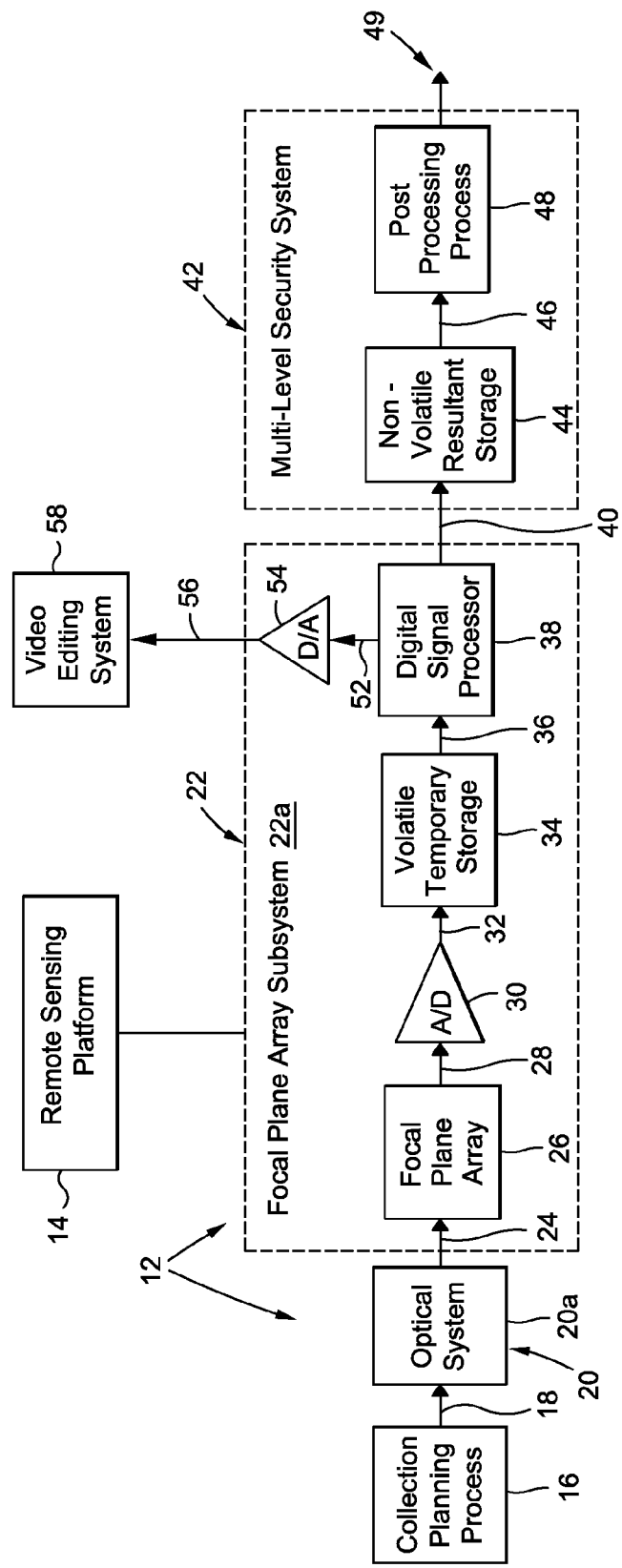
FIG. 1 is an illustration of a system block diagram of an embodiment of an imaging system that may be used in an embodiment of a dynamic image masking system and method of the disclosure.

With reference to the Figures, FIG. 1 is an illustration of a system block diagram of an embodiment of an imaging system 12 that may be used in an embodiment of a dynamic image masking system 10 (see FIG. 2), a method 150 (see FIG. 5A), and a method 170 (see FIG. 5B) of the disclosure.

As shown in FIG. 1, the imaging system 12 is associated with a remote sensing platform 14, and comprises an optical system 20 and an image sensing system 22. The optical system 20 (see FIG. 1), such as a camera 20a (see also FIG. 4A), represents an optical view of the whole world. A collection planning process 16 (see FIG. 1) outputs a collection planning process output 18 (see FIG. 1) to the optical system 20 (see FIG. 1). The optical system (see FIG. 1) outputs raw image data output 24 to a focal plane array 26 (see FIG. 1) of the focal plane array subsystem 22a (see FIG. 1).

As shown in FIG. 1, the image sensing system 22 (see FIG. 1) may comprise the focal plane array subsystem 22a (see FIG. 1), and the focal plane array subsystem 22a comprises the focal plane array 26, an analog to digital converter (A/D) 30, a volatile temporary storage 34, a digital signal processor 38, and a digital to analog converter (D/A) 54.

The focal plane array 26 (see FIG. 1) reads the raw image data 24 (see FIG. 1) and passes it to the analog to digital converter 30 (see FIG. 1). The analog to digital converter 30 (see FIG. 1) outputs analog to digital converter output 32 (see FIG. 1) to the volatile temporary storage 34 (see FIG. 1) where an image 122 (see FIG. 4A) is temporarily stored (a subsequent image overwrites a current image). The volatile temporary storage 34 (see FIG. 1) then outputs volatile temporary storage output 36 (see FIG. 1) to the digital signal processor 38 (see FIG. 1). Several actions may take place in the digital signal processor 38 (see FIG. 1), including, for example, reading digital signals 37 (see FIG. 4B), adjusting gains, processing the digital signals 37 (see FIG. 4B) through a Bayer filter (i.e., a color filter array (CFA) for arranging RGB (red, green, blue) color filters on a square grid of photosensors to a jpg file format, for example), and performing image enhancements techniques such as edge sharpening. After the digital signal 37 (see FIG. 4B) is processed to a readable image format 39 (see FIG. 4B) by the digital signal processor 38 (see FIG. 1), the digital signal processor 38 (see FIG. 1) outputs digital output 40 (see FIG. 1) for storage in a non-volatile resultant storage 44 (see FIG. 1) of a multi-level security system 42 (see FIG. 1). From the non-volatile resultant storage 44 (see FIG. 1), non-volatile resultant storage output 46 (see FIG. 1) may be output to a post processing process 48 (see FIG. 1) of the multi-level security system 42 (see FIG. 1) for post processing, if needed. The post processing process 48 (see FIG. 1) outputs a postprocessed output product 49 (see FIG. 1).

If the optical system 20 is analog, the digital signal processor 38 (see FIG. 1) outputs digital signal processor output from analog 52 (see FIG. 1) to the digital to analog converter 54 (see FIG. 1), and the digital to analog converter 54 (see FIG. 1) converts the signal to analog and outputs analog output 56 (see FIG. 1). The analog output 56 (see FIG. 1) may be used or stored in a video editing system 58 (see FIG. 1).

Figure 2:
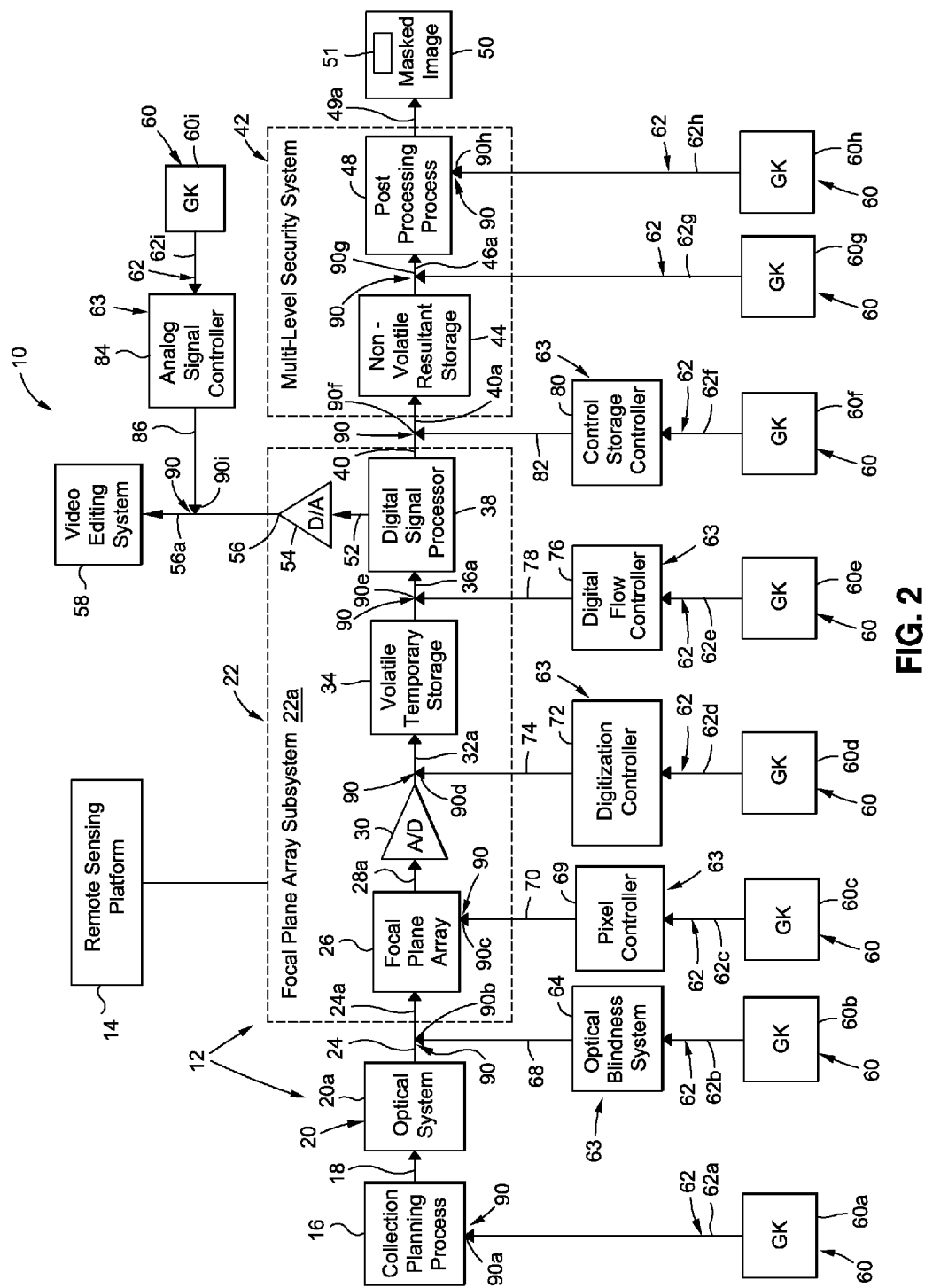
FIG. 2 is an illustration of a system block diagram of an embodiment of a dynamic image masking system of the disclosure with the imaging system of FIG. 1 and showing a gatekeeper algorithm and various image alteration locations in the dynamic image masking system.
Figure 4A:
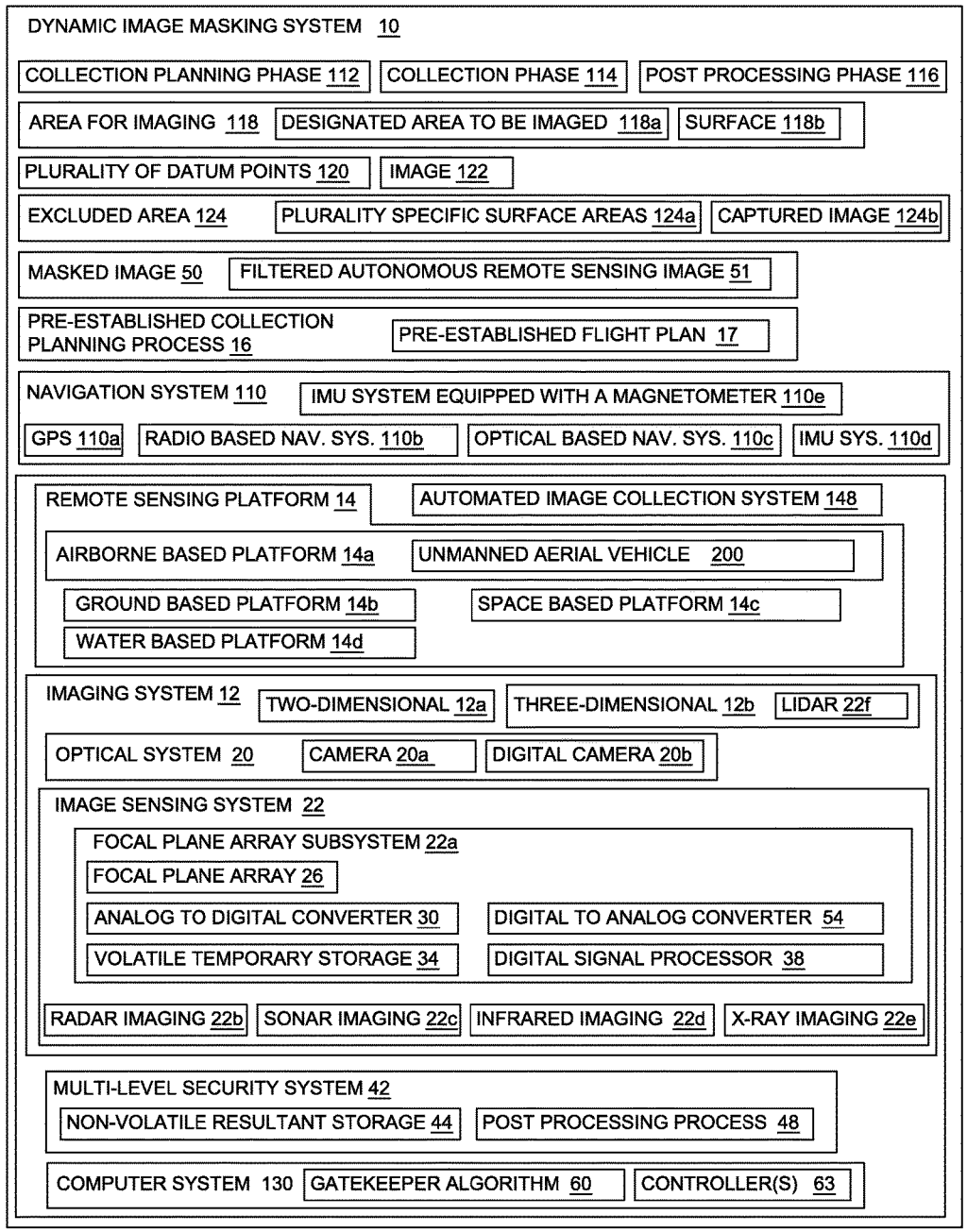
FIG. 4A is an illustration of a system block diagram of one of the embodiments of a dynamic image masking system of the disclosure.
Figure 4B:
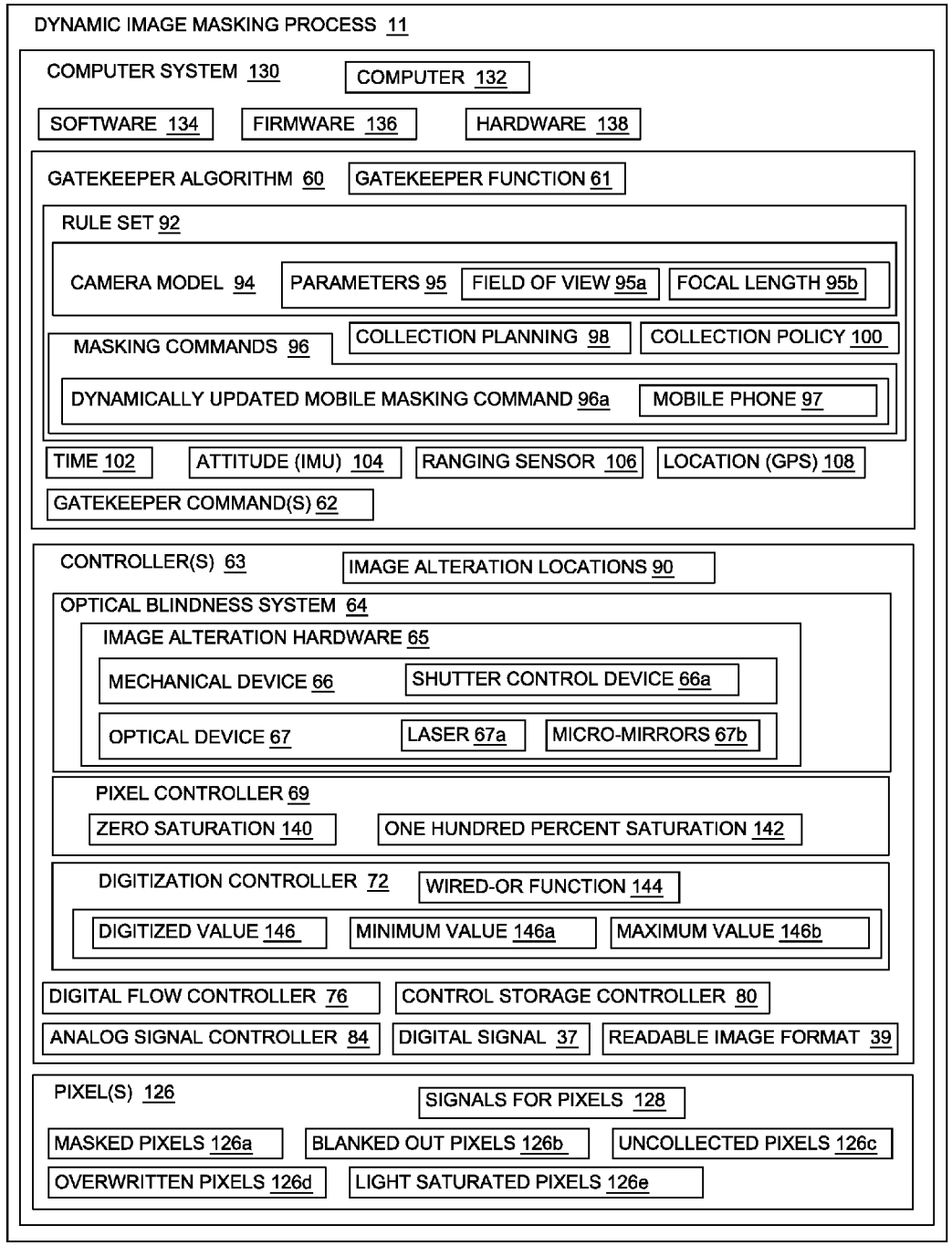
FIG. 4B is an illustration of a system block diagram of one of the embodiments of a dynamic image masking process of the disclosure.

In an embodiment of the disclosure, there is provided a dynamic image masking system 10 (see FIGS. 2, 4A) for providing a filtered autonomous remote sensing image 51 (see FIGS. 2, 4A) through a dynamic image masking process 11 (see FIGS. 4A-4B). FIG. 2 is an illustration of a system block diagram of an embodiment of a dynamic image masking system 10 of the disclosure with the imaging system 12 of FIG. 1 and showing a gatekeeper (GK) algorithm 60 and various image alteration locations 90 in the dynamic image masking system 10.

FIG. 2 shows the image alteration locations 90 where one or more pixels 126 (see FIG. 4B) in one or more images 122 (see FIG. 4A) may be altered to produce a masked image 50, such as the filtered autonomous remote sensing image 51. FIG. 4A is an illustration of a system block diagram of one of the embodiments of the dynamic image masking system 10 of the disclosure. FIG. 4B is an illustration of a system block diagram of one of the embodiments of a dynamic image masking process 11 of the disclosure.

Figure 3:
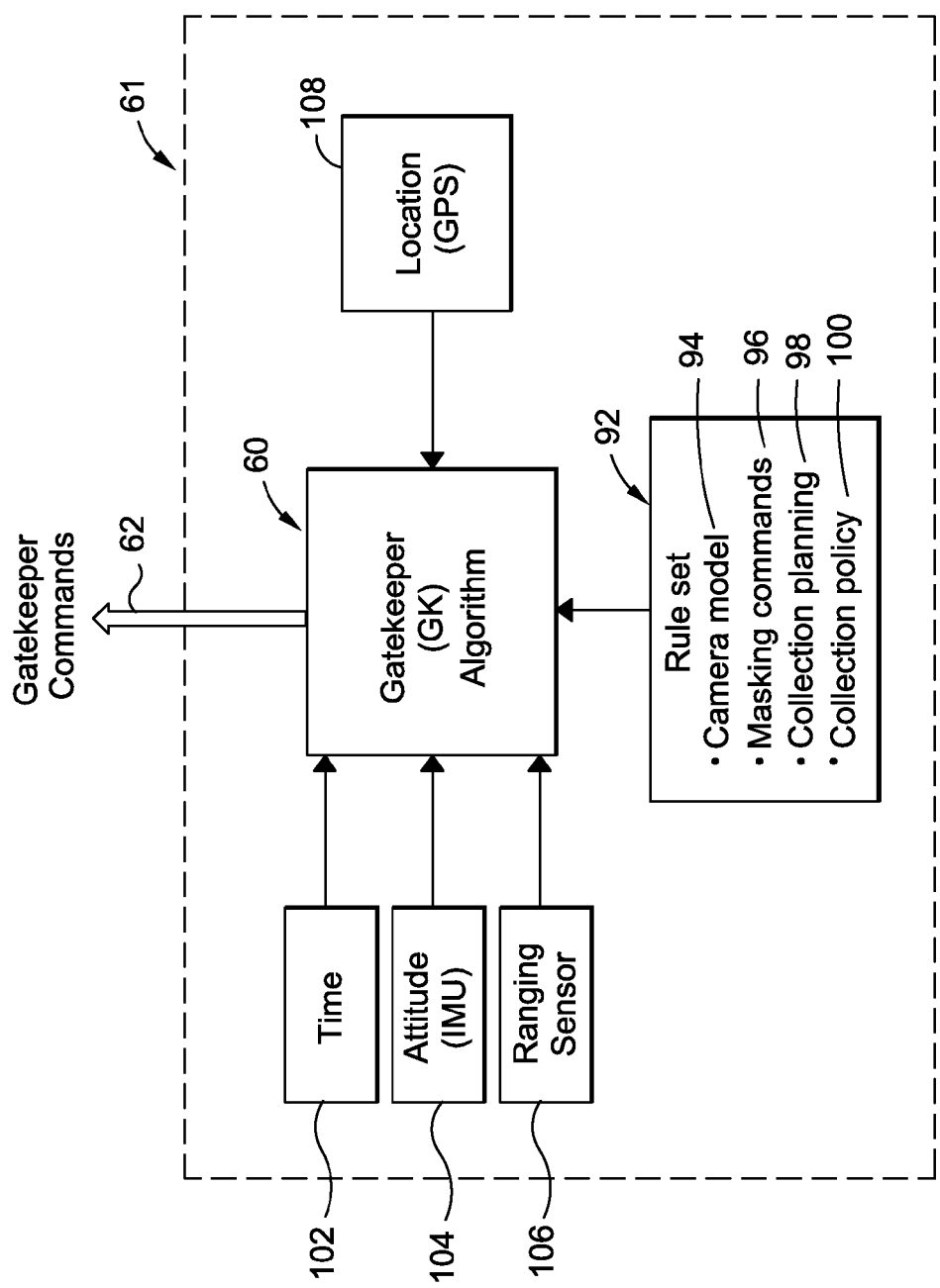
FIG. 3 is an illustration of a functional block diagram of an embodiment of a gatekeeper algorithm used in an embodiment of a dynamic image masking system and method of the disclosure.

Before the dynamic image masking system 10 shown in FIG. 2 and FIG. 4A is discussed in detail, the gatekeeper algorithm 60 (see FIGS. 2, 3, 4B) will be discussed. FIG. 3 is an illustration of a functional block diagram of an embodiment of the gatekeeper algorithm 60 used in an embodiment of the dynamic image masking system 10 (see FIG. 2), the method 150 (see FIG. 5A), and the method 170 (see FIG. 5B) of the disclosure. FIG. 3 shows a gatekeeper (GK) function 61. As used herein, "algorithm" means a set of instructions or list of steps for performing a task or solving a problem.

The gatekeeper algorithm 60 (see FIG. 3) calculates where a pixel 126 (see FIG. 4B) is coming from, for example, on the ground, and determines if the pixel 126 (see FIG. 4B) is in an area for imaging 118 (see FIG. 4A) or not. If the pixel 126 (see FIG. 4B) is in the area for imaging 118 (see FIG. 4A), then the pixel 126 (see FIG. 4B) of an image 122 (see FIG. 4B) is captured. If the pixel 126 (see FIG. 4B) is not in the area for imaging 118 (see FIG. 4A), then the pixels 126 (see FIG. 4B) is replaced with an appropriate value, where an exact value depends on the method of pixel replacement used.

Figure 6:
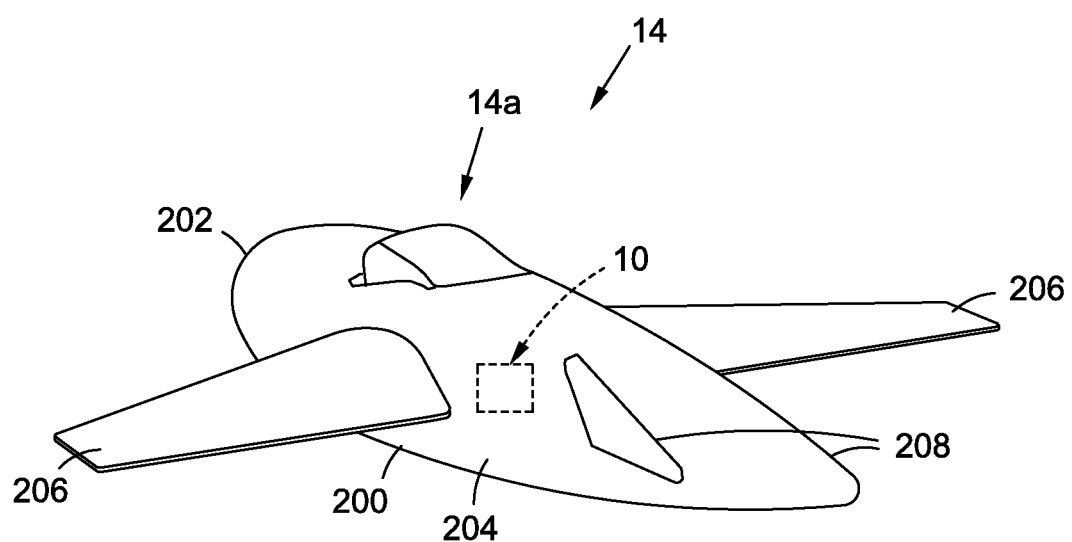
FIG. 6 is an illustration of a schematic representation of an unmanned aerial vehicle (UAV) that may be used in an embodiment of a dynamic image masking system and method of the disclosure.

As shown in FIG. 3, the gatekeeper algorithm 60 preferably takes a location (GPS) 108, such as obtained with a global positioning system (GPS), and an attitude (IMU) 104, such as obtained with an inertial measurement unit (IMU), of a remote sensing platform 14, for example, an airborne based platform 14a (see FIG. 4B) in the form of an unmanned aerial vehicle 200 (see FIGS. 4B, 6). Preferably the GPS and IMU data are of high fidelity to avoid any issues with attitude (IMU) 104 or location (GPS) 108 or positioning, which may affect a designated area to be imaged 118a (see FIG. 4A).

As further shown in FIG. 3, the gatekeeper algorithm 60 may also take information such as time 102, ranging sensor 106, altitude, speed, flight profile, or other information of the remote sensing platform 14 (see FIG. 2). As further shown in FIG. 3, the gatekeeper algorithm 60 preferably applies a rule set 92 that may contain a camera model 94, which includes parameters 95 (see FIG. 4B), such as field of view 95a (see FIG. 4B) and focal length 95b (see FIG. 4B); masking commands 96; information relating to collection planning 98; information relating to collection policy 100; or other suitable information, to generate a masked image 50 (see FIG. 2). In this way, the gatekeeper algorithm 60 (see FIG. 3) provides gatekeeper (GK) commands 62 (see FIGS. 2, 3) to one or more controllers 63 (see FIG. 2) regarding which of the one or more pixels 126 (see FIG. 4B) to alter.

In one embodiment, the masking command 96 (see FIG. 3) may comprise a dynamically updated mobile masking command 96a (see FIG. 4B) for fixed or moving objects or people to publicly broadcast their location or position. For example, this embodiment allows a first person not wanting his or her picture to be taken in public to broadcast with a device, such as a mobile phone 97 (see FIG. 4B), his or her location or position, to a second person taking pictures. The second person's optical system 20 (see FIG. 2), such as a camera 20a (see FIG. 2), or a sensor would receive the position of the first person and determine if the first person can be identified in the camera frame, based on the camera model 94 (see FIG. 4B), and camera parameters 95 (see FIG. 4B), such as field of view 95a (see FIG. 4B), focal length 95b (see FIG. 4B), settings, or other suitable camera parameters 95 (see FIG. 5B). If so, the optical system 20 (see FIG. 2), such as the camera 20a (see FIG. 2), or sensor would mask or blur the first person's image.

The dynamic image masking system 10 (see FIGS. 2, 4A) is preferably an automated image collection system 148 (see FIG. 4A) that includes the gatekeeper algorithm 60 (see FIGS. 2, 3, 4B) that provides gatekeeper commands 62 (see FIGS. 2, 3, 4B), to one or more controllers 63 (see FIGS. 2, 4B) that control via the dynamic image masking process 11 (see FIGS. 4A-4B) one or more image alteration locations 90 (see FIG. 2) located in the dynamic image masking system 10 (see FIG. 2).

As used herein, "dynamic image masking" means masking, blanking out, blocking out, overwriting, light saturating (blinding), not collecting, eliminating, constraining, or otherwise altering one or more pixels 126 (see FIG. 4B) in one or more images 122 (see FIG. 4A) of excluded area 124 (see FIG. 4A), where the one or more pixels 126 (see FIG. 4B) are unwanted, extraneous, or restricted. The dynamic image masking system 10 (see FIGS. 2, 4A) and the dynamic image masking process 11 (see FIGS. 4A-4B) produce a masked image 50 (see FIG. 4A), such as a filtered autonomous remote sensing image 51 (see FIG. 4A), that is reliable and repeatable and that preferably results in a product set with only the pixels 126 (see FIG. 4B) of interest getting utilized The one or more pixels 126 (see FIG. 4B) that undergo the dynamic image masking process 11 may result in, for example, masked pixels 126a (see FIG. 4B), blanked out pixels 126b (see FIG. 4B), uncollected pixels 126c (see FIG. 4B), overwritten pixels 126d (see FIG. 4B), light saturated pixels 126e (see FIG. 4B), or other suitably altered pixels.

As shown in FIGS. 2, 4A, the dynamic image masking system 10 comprises the imaging system 12 associated with a remote sensing platform 14, as shown in FIG. 1. The imaging system 12 (see FIGS. 2, 4A) may comprise a two-dimensional imaging system 12a (see FIG. 4A), a three-dimensional imaging system 12b (see FIG. 4A) such as stereo imaging, or another suitable imaging system 12 (see FIG. 4A). As shown in FIGS. 2, 4A, the imaging system 12 comprises an optical system 20 and an image sensing system 22.

As shown in FIG. 4A, the remote sensing platform 14 may comprise an airborne based platform 14a, such as an unmanned aerial vehicle 200 (see FIG. 6), a ground based platform 14b, a space based platform 14c, or a water based platform 14d. The remote sensing platform 14 (see FIG. 4A) may also comprise another suitable platform.

As shown in FIGS. 2, 4A, the dynamic image masking system 10 further comprises a multi-level security system 42 associated with the imaging system 12. The multi-level security system 42 (see FIG. 2) comprises the non-volatile resultant storage 44 (see FIG. 2) and the post processing process 48 (see FIG. 2). The non-volatile resultant storage 44 (see FIG. 2) may comprise any suitable computer readable storage media, such as read only memory (ROM), random access memory (RAM), video memory (VRAM), hard disk, floppy diskette, compact disc (CD), magnetic tape, a combination thereof, or another suitable computer readable storage device.

The multi level security system 42 (see FIGS. 2, 4A) is preferably required to maintain the integrity of the data for the images 122 (see FIG. 4B). The multi level security system 42 (see FIGS. 2, 4A) controls access to the dynamic image masking system 10 as well as access to information regarding individual pixels 126 (see FIG. 4B).

As shown in FIGS. 2, 4B, the dynamic image masking system 10 further comprises one or more image alteration locations 90 preferably located in the imaging system 12 and the multi-level security system 42. The alteration of the one or more images 90 takes place via the dynamic image masking process 11. One or more image alteration locations 90 (see FIG. 2) may also be located outside the imaging system 12 (see FIG. 2) and the multi-level security system 42 (see FIG. 2).

The dynamic image masking system 10 (see FIGS. 2, 4A) preferably comprises a collection planning phase 112 (see FIG. 4A), a collection phase 114 (see FIG. 4A), and a post processing phase 116 (see FIG. 4A) for planning, collecting and post processing of one or more images 122 (see FIG. 4A) collected during a collection event or mission. For the collection planning phase 112 (see FIG. 4A), the dynamic image masking system 10 (see FIGS. 2, 4A) may preferably comprise a pre-established collection planning process 16 (see FIGS. 1, 2, 4A). For example, the pre-established collection planning process 16 (see FIG. 4A) may comprise a pre-established flight plan 17 (see FIG. 4A) of an airborne based platform 14a (see FIG. 4A), such as unmanned aerial vehicle 200 (see FIG. 6).

The pre-established collection planning process 16 (see FIGS. 1, 2, 4A) preferably includes determining excluded area 124 (see FIG. 4A) not to be imaged with the imaging system 12 (see FIGS. 1, 2, 4A) prior to a collection event or mission, for example, prior to flying the unmanned aerial vehicle 200 (see FIG. 6) over an area for imaging 118 (see FIG. 4A). The pre-established collection planning process 16 (see FIGS. 1, 2, 4A) allows for dynamically planning what areas not to collect images 122 (see FIG. 4A) and excluding such areas from the collection or mission plan prior to commencement of a collection event or mission.

The pre-established collection planning process 16 (see FIGS. 2, 4A) may be conducted as a manual process or an automated process. The automated process preferably uses the gatekeeper (GK) algorithm 60 (see FIG. 2), such as gatekeeper (GK) algorithm 60a (see FIG. 2), configured to send a gatekeeper command 62 (see FIG. 2), such as gatekeeper command 62a (see FIG. 2), to the pre-established collection planning process 16 (see FIG. 2), at an image alteration location 90 (see FIG. 2), such as image alteration location 90a (see FIG. 2). The gatekeeper command 62 (see FIG. 2), such as gatekeeper command 62a (see FIG. 2), may preferably comprise at this collection planning phase 112 (see FIG. 4A), a rule set 92 (see FIG. 3) comprising collection planning 98 (see FIG. 3) and collection policy (100), or other suitable rules and policies. The collection planning 98 (see FIG. 3) and the collection policy 100 (see FIG. 3) preferably include implementation of specific privacy policies and rules in current effect in the area, region, state, country, and/or nation of the collection event or mission.

As shown in FIG. 2, the image alteration location 90, such as image alteration location 90a, is located before input to the optical system 20 of the imaging system 12. As further shown in FIG. 2, collection planning process output 18 is output from the collection planning process 16 and input into the optical system 20.

For the collection phase 114 (see FIG. 4A) of the dynamic image masking system 10 (see FIGS. 2, 4A), the imaging system 12 (see FIGS. 2, 4A) is preferably used to designate an area for imaging 118 (see FIG. 4A) to obtain a designated area to be imaged 118a (see FIG. 4A). A plurality of datum points 120 (see FIG. 4A) may be established on a surface 118b (see FIG. 4A) of the designated area to be imaged 118a (see FIG. 4A). A plurality of specific surface areas 124a (see FIG. 4A) may be designated as excluded area 124 (see FIG. 4A) not to be imaged with reference to the plurality of datum points 120 (see FIG. 4A).

The dynamic image masking system 10 (see FIG. 4A) may further comprise a navigation system 110 (see FIG. 4A) to position the imaging system 12 (see FIGS. 2, 4A) to image the designated area to be imaged 118a (see FIG. 4A). The navigation system 110 (see FIG. 4A) may comprise a global positioning system (GPS) 110a (see FIG. 4A), a radio based navigation system 110b (see FIG. 4A), an optical based navigation system 110c (see FIG. 4A), an inertial measurement unit (IMU) system 110d (see FIG. 4A), an inertial measurement unit (IMU) system equipped with a magnetometer 110e (see FIG. 4A), a combination thereof, or another suitable navigation system 110 (see FIG. 4A).

As shown in FIGS. 1, 2, 4A, the optical system 20 may comprise a camera 20a. Preferably, the camera 20a (see FIGS. 1, 2, 4A) is a digital camera 20b (see FIG. 4A). The optical system 20 (see FIGS. 1, 2, 4A) may also comprise other suitable camera devices or advanced optics devices. As discussed above, the optical system 20 represents an optical view of the whole world.

As shown in FIGS. 2, 4B, the dynamic image masking system 10 further comprises an optical blindness system 64 located between the optical system 20 and the image sensing system 22. As further shown in FIGS. 2, 4B, the gatekeeper (GK) algorithm 60, such as gatekeeper (GK) algorithm 60b, is configured to send a gatekeeper command 62, such as gatekeeper command 62b, to a controller 63, such as the optical blindness system 64, to control an image alteration location 90, such as image alteration location 90b. The gatekeeper algorithm 60b (see FIG. 2) is configured to send the gatekeeper command 62b (see FIG. 2), either mechanically or optically, to the optical blindness system 64 (see FIG. 2) that controls the image alteration location 90b (see FIG. 2) located between the optical system 20 (see FIG. 2) and the image sensing system 22 (see FIG. 2).

With this optical blindness system 64 (see FIG. 2) embodiment, no extraneous pixels are processed because the pixels 126 (see FIG. 4B) are altered before registering on the focal plane array 26 (see FIG. 2) of the image sensing system 22 (see FIG. 2). The pixel 126 (see FIG. 4B) may either be inhibited from collecting photons, or the pixel 126 (see FIG. 4B) may be light saturated by illuminating it 100% to cause "blindness" to occur.

The optical blindness system 64 (see FIGS. 2, 4B) may be used with image alteration hardware 65 (see FIG. 4B). The image alteration hardware 65 (see FIG. 4B) may comprise a mechanical device 66 (see FIG. 4B), such as a shutter control mechanical device 66a (see FIG. 4B), that may be used to inhibit a plurality of pixels 126 (see FIG. 4B) from collecting photons. Alternatively, the image alteration hardware 65 (see FIG. 4B) may comprise an optical device 67 (see FIG. 4B), such as a laser optical device 67a (see FIG. 4B) and a micro-mirrors optical device 67b (see FIG. 4B), that may be used to illuminate specific pixels 126 (see FIG. 4B) on the focal plane array 26 (see FIG. 2), causing blindness of the pixels 126 (see FIG. 4B).

The gatekeeper command 62 (see FIG. 2), such as gatekeeper command 62b (see FIG. 2), may preferably comprise at this collection phase 114 (see FIG. 4A), the rule set 92 (see FIG. 3) comprising camera model 94 (see FIG. 3), masking commands 96 (see FIG. 3), collection planning (98), collection policy (100), or other suitable rules and policies. The gatekeeper command 62 (see FIG. 2), such as gatekeeper command 62b (see FIG. 2), may preferably further comprise at this collection phase 114 (see FIG. 4A), time 102 (see FIG. 3), attitude (IMU) 104 (see FIG. 3), ranging sensor 106 (see FIG. 3), and/or location (GPS) 108 (see FIG. 3).

As shown in FIG. 1, the optical system 20 outputs raw image data 24 obtained with the optical system 20 and inputs the raw image data 24 to the image sensing system 22 of the imaging system 12. As shown in FIG. 2, with the use of the gatekeeper algorithm 60, such as gatekeeper algorithm 60b, and the optical blindness system 64 that uses an optical blindness system output 68 to control the image alteration location 90, such as image alteration location 90b, through the dynamic image masking process 11 (see FIGS. 4A-4B), the one or more pixels 126 (see FIG. 4B) are masked or altered. Thus, with the use of the gatekeeper algorithm 60 (see FIG. 2), such as gatekeeper algorithm 60b (see FIG. 2), and the optical blindness system 64 (see FIG. 2), masked raw image data 24a (see FIG. 2) is input to the focal plane array 26 (see FIG. 2) of the image sensing system 22 (see FIG. 2).

As shown in FIGS. 2, 4A, the image sensing system 22 comprises the focal plane array subsystem 22a comprising the focal plane array 26, the analog to digital converter (A/D) 30, the volatile temporary storage 34, the digital signal processor 38, and the digital to analog converter (D/A) 54. As the focal plane array subsystem 22a (see FIG. 2) may be an integrated circuit, the focal plane array subsystem 22a (see FIG. 2) may require some disintegrating in order to interrupt a signal at a desired image alteration location 90 (see FIG. 2) in the focal plane array subsystem 22a (see FIG. 2) of the image sensing system 22 (see FIG. 2), such as for example, at image alteration locations 90c, 90d, and 90e.

As shown in FIG. 4A, the image sensing system 22 may further comprise a radar imaging system 22b, a sonar imaging system 22c, an infrared imaging system 33d, an x-ray imaging system 22e, a light detection and ranging system (LIDAR) 22f, or another suitable image sensing system 22.

As shown in FIG. 2, the gatekeeper algorithm 60, such as in the form of gatekeeper algorithm 60c, is configured to send a gatekeeper command 62, such as in the form of gatekeeper command 62c, to a controller 63, such as a pixel controller 69. The pixel controller 69 (see FIG. 2) uses a pixel controller output 70 to control the image alteration location 90, such as image alteration location 90c, through the dynamic image masking process 11 (see FIGS. 4A-4B), by overwriting one or more pixels 126 (see FIG. 2) on the focal plane array 26 (see FIG. 2) with either zero saturation 140 (see FIG. 4B) or one hundred percent saturation 142 (see FIG. 4B).

With this pixel controller 69 (see FIG. 2) embodiment, the pixel controller 69 (see FIG. 2) feeds the focal plane array 26 (see FIG. 2) and essentially overwrites pixels 126 (see FIG. 4B) on the focal plane array 26 (see FIG. 2) with either a 0 (zero) (corresponds to 0) or 100% (one hundred percent) saturation (this level may correspond to a value of 256 for an 8 bit system).

As shown in FIG. 1, the focal plane array 26 outputs focal plane array output 28 and inputs the focal plane array output 28 to the analog to digital converter 30. As shown in FIG. 2, with the use of the gatekeeper algorithm 60, such as gatekeeper algorithm 60c, and the pixel controller 69 that uses the pixel controller output 70 to control the image alteration location 90, such as image alteration location 90c, through the dynamic image masking process 11 (see FIGS. 4A-4B), the one or more pixels 126 (see FIG. 4B) are masked or altered by overwriting. Thus, with the use of the gatekeeper algorithm 60 (see FIG. 2), such as gatekeeper algorithm 60c (see FIG. 2), and the pixel controller 69 (see FIG. 2), a masked focal plane array output 28a (see FIG. 2), is input to the analog to digital converter 30.

As further shown in FIG. 2, the analog to digital converter 30 receives the masked focal plane array output 28a (see FIG. 2), which is preferably in the form of masked raw image data 24a, from the focal plane array 26. The analog to digital converter 30 (see FIG. 2) converts the masked raw image data 24a from analog to digital signals 37 (see FIG. 4B).

As shown in FIG. 2, the gatekeeper algorithm 60, such as in the form of gatekeeper algorithm 60d, is configured to send a gatekeeper command 62, such as in the form of gatekeeper command 62d, to a controller 63, such as a digitization controller 72. The digitization controller 72 (see FIG. 2) uses a digitization controller output 74 to control the image alteration location 90, such as image alteration location 90d, through the dynamic image masking process 11 (see FIGS. 4A-4B). The image alteration location 90d (see FIG. 2) is located between the analog to digital converter 30 (see FIG. 2) and the volatile temporary storage 34 (see FIG. 2). The one or more pixels 126 (see FIG. 4B) are preferably altered at the image alteration location 90d by setting a digitized value 146 (see FIG. 4B) for the one or more pixels 126 (see FIG. 4B) of either a minimum value 146a (see FIG. 4B) or a maximum value 146b (see FIG. 4B).

With this digitization controller 72 (see FIG. 2) embodiment, the digitization controller 72 (see FIG. 2) controls the digitization after the analog to digital converter 30 (see FIG. 2) by setting the digitized value 146 (see FIG. 4B) either high (minimum value 146a (see FIG. 4B)) or low (maximum value 146b (see FIG. 4B)). This way the signals for certain pixels 126 (see FIG. 4B) are essentially shorted out (value set low) or maxed out (value set high). This embodiment may be used with custom interface electronics, for example, a wired-OR function 144 (see FIG. 4B) which is a hardware implementation of a Boolean operator. The wired-OR function 144 (see FIG. 4B) electrically performs a Boolean logic operation of an OR gate, using a pull down resistor and one diode per input.

As shown in FIG. 1, the analog to digital converter 30 outputs analog to digital converter output 32 and inputs the analog to digital converter output 32 to the volatile temporary storage 34. As shown in FIG. 2, with the use of the gatekeeper algorithm 60, such as gatekeeper algorithm 60d, and the digitization controller 72 that uses the digitization controller output 74 to control the image alteration location 90, such as image alteration location 90d, through the dynamic image masking process 11 (see FIGS. 4A-4B), the one or more pixels 126 (see FIG. 4B) are masked or altered by overwriting. Thus, with the use of the gatekeeper algorithm 60 (see FIG. 2), such as gatekeeper algorithm 60d (see FIG. 2), and the digitization controller 72 (see FIG. 2), a masked analog to digital converter output 32a (see FIG. 2) is input to the volatile temporary storage 34 (see FIG. 2).

As further shown in FIG. 2, the volatile temporary storage 34 receives the masked analog to digital converter output 32a, which is preferably in the form of digital signals 37 (see FIG. 4B), from the analog to digital converter 30. The volatile temporary storage 34 temporarily stores the digital signals 37 (see FIG. 4B) from the analog to digital converter 30.

As shown in FIG. 2, the gatekeeper algorithm 60, such as in the form of gatekeeper algorithm 60e, is configured to send a gatekeeper command 62, such as in the form of gatekeeper command 62e, to a controller 63, such as a digital flow controller 76. The digital flow controller 76 (see FIG. 2) uses a digital flow controller output 78 to control the image alteration location 90, such as image alteration location 90e, through the dynamic image masking process 11 (see FIGS. 4A-4B). The image alteration location 90e (see FIG. 2) is located between the volatile temporary storage 34 (see FIG. 2) and the digital signal processor 38 (see FIG. 2). The one or more pixels 126 (see FIG. 4B) are preferably altered at the image alteration location 90e by altering a single image 122 (see FIG. 4A) at a time and masking the one or more pixels 126 (see FIG. 4B) in the single image 122 (see FIG. 4A).

With this digital flow controller 76 (see FIG. 2) embodiment, the volatile temporary storage 34 (see FIG. 2) outputs a single image 122 (see FIG. 4A) at a time to the digital signal processor 38 (see FIG. 2). This occurs since memory of the volatile temporary storage 34 (see FIG. 2) is written over for each single image 122 (see FIG. 4A) that is processed.

As shown in FIG. 1, the volatile temporary storage 34 outputs volatile temporary storage output 36 and inputs the volatile temporary storage output 36 to the digital signal processor 38. As shown in FIG. 2, with the use of the gatekeeper algorithm 60, such as gatekeeper algorithm 60e, and the digital flow controller 76 that uses the digital flow controller output 78 to control the image alteration location 90, such as image alteration location 90e, through the dynamic image masking process 11 (see FIGS. 4A-4B), the one or more pixels 126 (see FIG. 4B) are masked or altered by overwriting. Thus, with the use of the gatekeeper algorithm 60 (see FIG. 2), such as gatekeeper algorithm 60e (see FIG. 2), and the digital flow controller 76 (see FIG. 2), a masked volatile temporary storage output 36a (see FIG. 2), is input to the digital signal processor 38.

The digital signal processor 38 (see FIG. 2) receives the digital signals 37 (see FIG. 4B) from the volatile temporary storage 34 (see FIG. 2) and processes the digital signals 37 (See FIG. 4B) to a readable image format 39 (see FIG. 4B). When the imaging system 12 (see FIG. 2) uses analog output, a digital to analog converter 54 (see FIG. 2) receives readable digital signals from the digital signal processor 38 (see FIG. 2) and converts the readable digital signals to analog signals.

As shown in FIG. 2, the gatekeeper algorithm 60, such as in the form of gatekeeper algorithm 60f, is configured to send a gatekeeper command 62, such as in the form of gatekeeper command 62f, to a controller 63, such as a control storage controller 80. The control storage controller 80 (see FIG. 2) uses a control storage controller output 82 to control the image alteration location 90, such as image alteration location 90f, through the dynamic image masking process 11 (see FIGS. 4A-4B). The image alteration location 90f (see FIG. 2) is located at a digital signal processor output 40 (see FIGS. 1, 2) of the focal plane array subsystem 22a (see FIG. 2) of the imaging system 12 (see FIG. 2), and before input to the non-volatile resultant storage 44 (see FIG. 2) of the multi-level security system 42 (see FIG. 2). At the image alteration location 90f, the one or more pixels 126 (see FIG. 4B) may be altered by masking, so that they are not written to the non-volatile resultant storage 44 (see FIG. 2).

With this control storage controller 80 (see FIG. 2) embodiment, the control storage controller 80 (see FIG. 2) alters the image 122 (see FIG. 4A) at the output of the focal plane array subsystem 22a (see FIG. 2). The one or more pixels 126 (see FIG. 4B) that need to be constrained or eliminated (masked out) are determined by the gatekeeper algorithm 60 (see FIG. 2), such as gatekeeper algorithm 60f (see FIG. 2), and then this pixel information is correlated to a location in the image 122 (see FIG. 4A). The result is that unwanted pixels are blocked out and do not get written to the non-volatile resultant storage 44 (see FIG. 2).

As shown in FIG. 1, the digital signal processor 38 outputs digital output 40 and inputs the digital output 40 to the non-volatile resultant storage 44 of the multi-level security system 42. As shown in FIG. 2, with the use of the gatekeeper algorithm 60, such as gatekeeper algorithm 60f, and the control storage controller 80 that uses the control storage controller output 82 to control the image alteration location 90, such as image alteration location 90f, through the dynamic image masking process 11 (see FIGS. 4A-4B), the one or more pixels 126 (see FIG. 4B) are masked or altered by being blocked out and do not get written to the non-volatile resultant storage 44. Thus, with the use of the gatekeeper algorithm 60 (see FIG. 2), such as gatekeeper algorithm 60*f* (see FIG. 2), and the control storage controller 80 (see FIG. 2), masked digital output 40*a* (see FIG. 2) is output to the non-volatile resultant storage 44 (see FIG. 2) of the multi-level security system 42 (see FIG. 2).

As shown in FIG. 2, the gatekeeper algorithm 60, such as in the form of gatekeeper algorithm 60*g*, is configured to send a gatekeeper command 62, such as in the form of gatekeeper command 62*g*, to control the image alteration location 90, such as image alteration location 90*g*, through the dynamic image masking process 11 (see FIGS. 4A-4B). The image alteration location 90*g* (see FIG. 2) is located in the multi-level security system 42 (see FIG. 2) between the non-volatile resultant storage 44 (see FIG. 2) and the post processing process 48 (see FIG. 2). At the image alteration location 90*g*, the one or more pixels 126 (see FIG. 4B) may be altered by overwriting the one or more pixels 126 (see FIG. 4B) with either zero saturation 140 (see FIG. 4B) or one hundred percent saturation 142 (see FIG. 4B).

With this embodiment, the image 122 (see FIG. 4A) is altered after it exits the non-volatile resultant storage 44 (see FIG. 2) but before it is post processed in the post processing process 48 (see FIG. 2). The unwanted pixels, as determined by the gatekeeper algorithm 60 (see FIG. 2), such as gatekeeper algorithm 60*g* (see FIG. 2), are blocked out by overwriting their digitized value 146 (see FIG. 4B) with a known entity be it a 0 (zero) or a value that represents 100% (one hundred percent) of the allowed value of the pixel 126 (see FIG. 4B).

As shown in FIG. 1, the non-volatile resultant storage 44 outputs a non-volatile resultant storage output 46 and inputs the non-volatile resultant storage output 46 to the post processing process 48. As shown in FIG. 2, with the use of the gatekeeper algorithm 60, such as gatekeeper algorithm 60*g*, to control the image alteration location 90, such as image alteration location 90*g*, through the dynamic image masking process 11 (see FIGS. 4A-4B), the one or more pixels 126 (see FIG. 4B) are masked or altered. Thus, with the use of the gatekeeper algorithm 60 (see FIG. 2), such as gatekeeper algorithm 60*g* (see FIG. 2), a masked non-volatile resultant storage output 46*a* (see FIG. 2) is output to the post processing process 48 (see FIG. 2).

As shown in FIG. 2, the gatekeeper algorithm 60, such as in the form of gatekeeper algorithm 60*h*, is configured to send a gatekeeper command 62, such as in the form of gatekeeper command 62*h*, to control the image alteration location 90, such as image alteration location 90*h*, through the dynamic image masking process 11 (see FIGS. 4A-4B). The image alteration location 90*h* (see FIG. 2) is located in the multi-level security system 42 (see FIG. 2) at the post processing process 48 (see FIG. 2). At the image alteration location 90*h*, the one or more pixels 126 (see FIG. 4B) may be altered by editing or ignoring the one or more pixels 126 (see FIG. 4B) representing excluded area 124 (see FIG. 4B) of the designated area to be imaged 118*a* (see FIG. 4B).

With this embodiment, which is the post processing phase 116 (see FIG. 4A), the one or more pixels 126 (see FIG. 4B) are masked at the post processing process 48 (see FIG. 2). The image 122 (see FIG. 4A) is essentially altered by editing or simply ignoring the one or more pixels 126 (see FIG. 4B) that represent parts of an image 122 (see FIG. 4A) that are unwanted, such as excluded area 124 (see FIG. 4B).

As shown in FIG. 1, the post processing process 48 outputs a postprocessed output 49 out of the multi-level security system 42. As shown in FIG. 2, with the use of the gatekeeper algorithm 60, such as gatekeeper algorithm 6*h*, to control the image alteration location 90, such as image alteration location 90*h*, through the dynamic image masking process 11 (see FIGS. 4A-4B), the one or more pixels 126 (see FIG. 4B) are masked or altered. Thus, with the use of the gatekeeper algorithm 60 (see FIG. 2), such as gatekeeper algorithm 60*h* (see FIG. 2), the post processing process 48 outputs a masked postprocessed output 49*a* out of the multi-level security system 42 to obtain a masked image 50 (see FIG. 2), such as filtered autonomous remote sensing image 51 (see FIG. 2).

As shown in FIG. 2, the gatekeeper algorithm 60, such as in the form of gatekeeper algorithm 60*i*, is configured to send a gatekeeper command 62, such as in the form of gatekeeper command 62*i*, to a controller 63, such as an analog signal controller 84. The analog signal controller 84 (see FIG. 2) uses an analog signal controller output 86 to control the image alteration location 90, such as image alteration location 90*i*, through the dynamic image masking process 11 (see FIGS. 4A-4B).

The image alteration location 90*i* (see FIG. 2) is located at an analog output 56 (see FIG. 2) of the digital to analog converter 54 (see FIG. 2) of the focal plane array subsystem 22*a* (see FIG. 2), and before input to a video editing system 58 (see FIG. 2) located outside of the focal plane array subsystem 22*a* (see FIG. 2). The one or more pixels 126 (see FIG. 4B) are preferably altered at the image alteration location 90*i* by masking the one or more pixels 126 (see FIG. 4B) so that they are not written to the video editing system 58 (see FIG. 2).

As shown in FIG. 1, the digital signal processor 38 outputs digital signal processor output from analog 52 to the digital to analog converter 54, and the digital to analog converter 54 outputs analog output 56 out of the focal plane array subsystem 22*a* and inputs the analog output 56 to the video editing system 58. As shown in FIG. 2, with the use of the gatekeeper algorithm 60, such as gatekeeper algorithm 60*i*, and the analog signal controller 84 that uses the analog signal controller output 86 to control the image alteration location 90, such as image alteration location 90*i*, through the dynamic image masking process 11 (see FIGS. 4A-4B), the plurality of pixels 126 (see FIG. 4B) are masked or altered. Thus, with the use of the gatekeeper algorithm 60 (see FIG. 2), such as gatekeeper algorithm 60*i* (see FIG. 2), and the analog signal controller 84 (see FIG. 2), a masked analog output 56*a* (see FIG. 2) is input to the video editing system 58 (see FIG. 2).

As shown in FIG. 4B, the dynamic image masking system 10 further comprises a computer system 130 associated with the imaging system 12. The computer system 130 (see FIG. 4B) comprises the gatekeeper algorithm 60 (see FIGS. 2, 4B) configured to send the gatekeeper commands 62 (see FIGS. 2, 4B) to one or more controllers 63 (see FIGS. 2, 4B) that control the one or more image alteration locations 90 (see FIGS. 2, 4B) with the dynamic image masking process 11 (see FIGS. 2, 4B).

As shown in FIG. 4B, the computer system 130 preferably comprises a computer 132 and one or more of software 134, firmware 136, and hardware 138. The gatekeeper algorithms 60 and the controllers 63 may preferably be a combination of hardware 138 and firmware 136, or a combination of hardware 138 and software 134.

The software 134 (see FIG. 4B) or the firmware 136 (see FIG. 4B) may implement the gatekeeper algorithm 60 (see FIG. 3) designed to be used in conjunction with the computer 132 (see FIG. 4B) of the computer system 130 or other hardware 138 (see FIG. 4B) of the computer system 130 (see FIG. 4B).

Figure 5A:
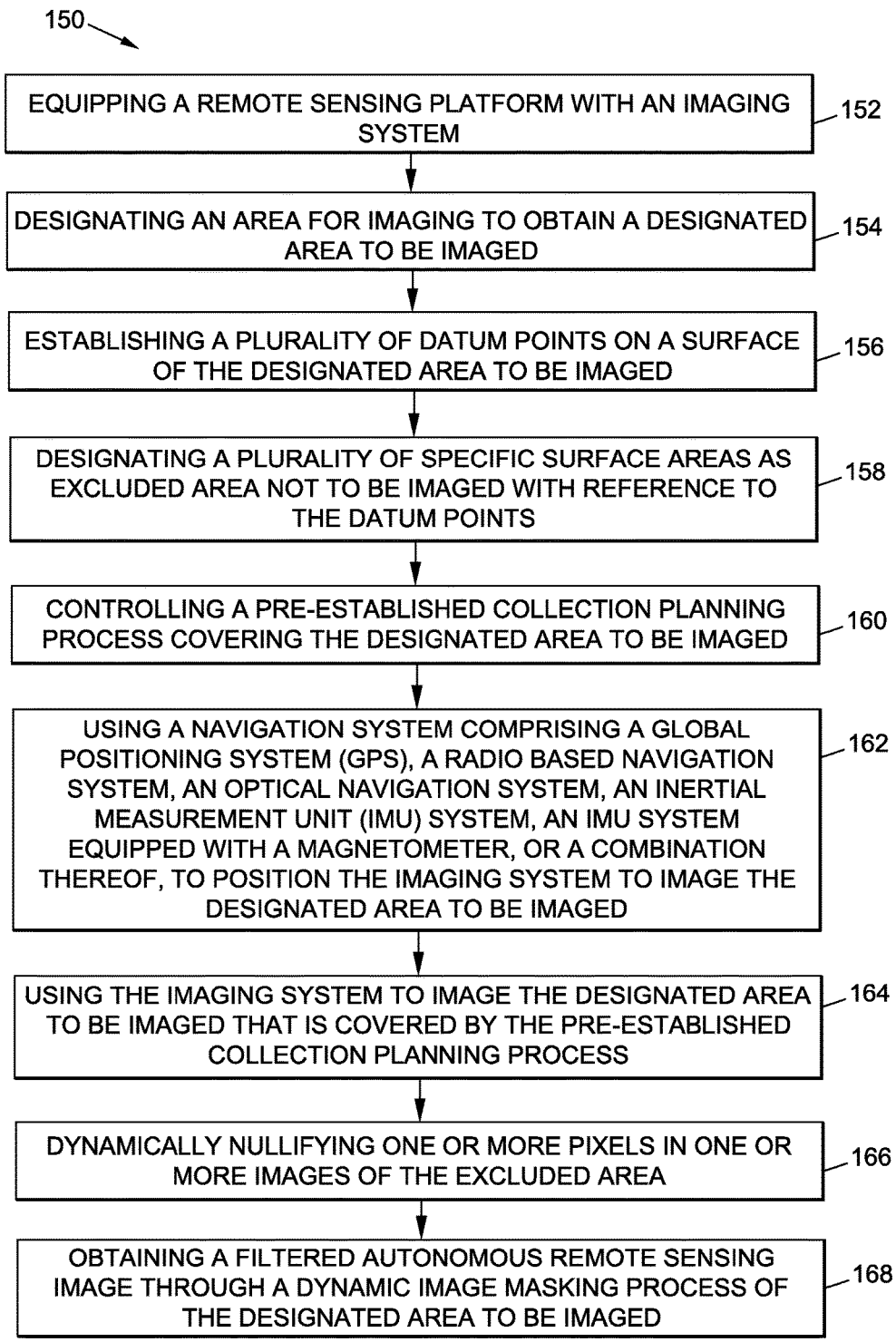
FIG. 5A is an illustration of a flow diagram of an embodiment of a method of the disclosure.

In another embodiment of the disclosure, there is provided a method 150 for (see FIG. 5A) providing a filtered autonomous remote sensing image 51 (see FIG. 4A) through a dynamic image masking process 11 (see FIG. 4B). FIG. 5A is an illustration of a flow diagram of an embodiment of the method 150 of the disclosure.

As shown in FIG. 5A, the method 150 comprises step 152 of equipping a remote sensing platform 14 (see FIGS. 2, 4A) with an imaging system 12 (see FIGS. 2, 4A). The step 152 of equipping the remote sensing platform 14 (see FIGS. 2, 4A) with the imaging system 12 (see FIGS. 2, 4A) comprises equipping the remote sensing platform 14 (see FIGS. 2, 4A) with the imaging system 12 (see FIGS. 2, 4A) comprising an optical system 20 (see FIG. 2) including a digital camera 20a (see FIG. 2), and an image sensing system 22 (see FIGS. 2, 4A) including a focal plane array subsystem 22a (see FIG. 4A), a radar imaging system 22b (see FIG. 4A), a sonar imaging system 22c (see FIG. 4A), an infrared imaging system 22d (see FIG. 4A), an x-ray imaging system 22e (see FIG. 4A), or a light detection and ranging (LIDAR) system 22f (see FIG. 4A).

The step 152 of equipping the remote sensing platform 14 (see FIGS. 2, 4A) with the imaging system 12 (see FIGS. 2, 4A) further comprises equipping the remote sensing platform 14 (see FIGS. 2, 4A) comprising an airborne based platform 14a (see FIG. 4A), a ground based platform 14b (see FIG. 4A), a space based platform 14c (see FIG. 4A), or a water based platform 14d (see FIG. 4A).

As shown in FIG. 5A, the method 150 further comprises step 154 of designating an area for imaging 118 (see FIG. 4A) to obtain a designated area to be imaged 118a (see FIG. 4A). As shown in FIG. 5A, the method 150 further comprises step 156 of establishing a plurality of datum points 120 (see FIG. 4A) on a surface 118b (see FIG. 4A) of the designated area to be imaged 118a (see FIG. 4A).

As shown in FIG. 5A, the method 150 further comprises step 158 of designating a plurality of specific surface areas 124a (see FIG. 4A) as excluded area 124 (see FIG. 4A) not to be imaged with reference to the plurality of datum points 120 (see FIG. 4A). As shown in FIG. 5A, the method 150 further comprises step 160 of controlling a pre-established collection planning process 16 (see FIGS. 2, 4A) covering the designated area to be imaged 118a (see FIG. 4A).

As shown in FIG. 5A, the method 150 comprises step 162 of using a navigation system 110 (see FIG. 4A) comprising a global positioning system (GPS) 110a (see FIG. 4A), a radio based navigation system 110b (see FIG. 4A), an optical based navigation system 110c (see FIG. 4A), an inertial measurement unit (IMU) system 110d (see FIG. 4A), an inertial measurement unit (IMU) system equipped with a magnetometer 110e (see FIG. 4A), or a combination thereof, to position the imaging system 12 (see FIGS. 2, 4A) to image the designated area to be imaged 118a (see FIG. 4A).

As shown in FIG. 5A, the method 150 further comprises step 164 of using the imaging system 12 (see FIGS. 2, 4A) to image the designated area to be imaged 118a (see FIG. 4A) that is covered by the pre-established collection planning process 16 (see FIGS. 2, 4A).

As shown in FIG. 5A, the method 150 comprises step 166 of dynamically nullifying one or more pixels 126 (see FIG. 4B) in one or more images 122 (see FIG. 4A) of the excluded area 124 (see FIG. 4A). The step 166 of dynamically nullifying the one or more pixels 126 (see FIG. 4B) from the one or more images 122 (see FIG. 4A) of the excluded area 124 (see FIG. 4A) comprises altering one or more captured images 124b (see FIG. 4B) of the excluded area 124 (see FIG. 4A), making them indecipherable.

In one embodiment, the altering of the one or more captured images 124b (see FIG. 4A) of the excluded area 124 (see FIG. 4A) is preferably carried out in real time during imaging of the designated area to be imaged 118a (see FIG. 4A). In another embodiment, the altering of the one or more captured images 124b (see FIG. 4A) of the excluded area 124 (see FIG. 4A) is carried out after overall imaging of the designated area to be imaged 118a (see FIG. 4A) is completed, and before the filtered autonomous remote sensing image 51 (see FIGS. 2, 4A) is obtained through the dynamic image masking process 11 (see FIG. 4B) of the designated area to be imaged 118a (see FIG. 4A).

As shown in FIG. 5A, the method 150 comprises step 168 of obtaining a filtered autonomous remote sensing image 51 (see FIGS. 2, 4A) through the dynamic image masking process 11 (see FIG. 4B) of the designated area to be imaged 118a (see FIG. 4A).

Figure 5B:
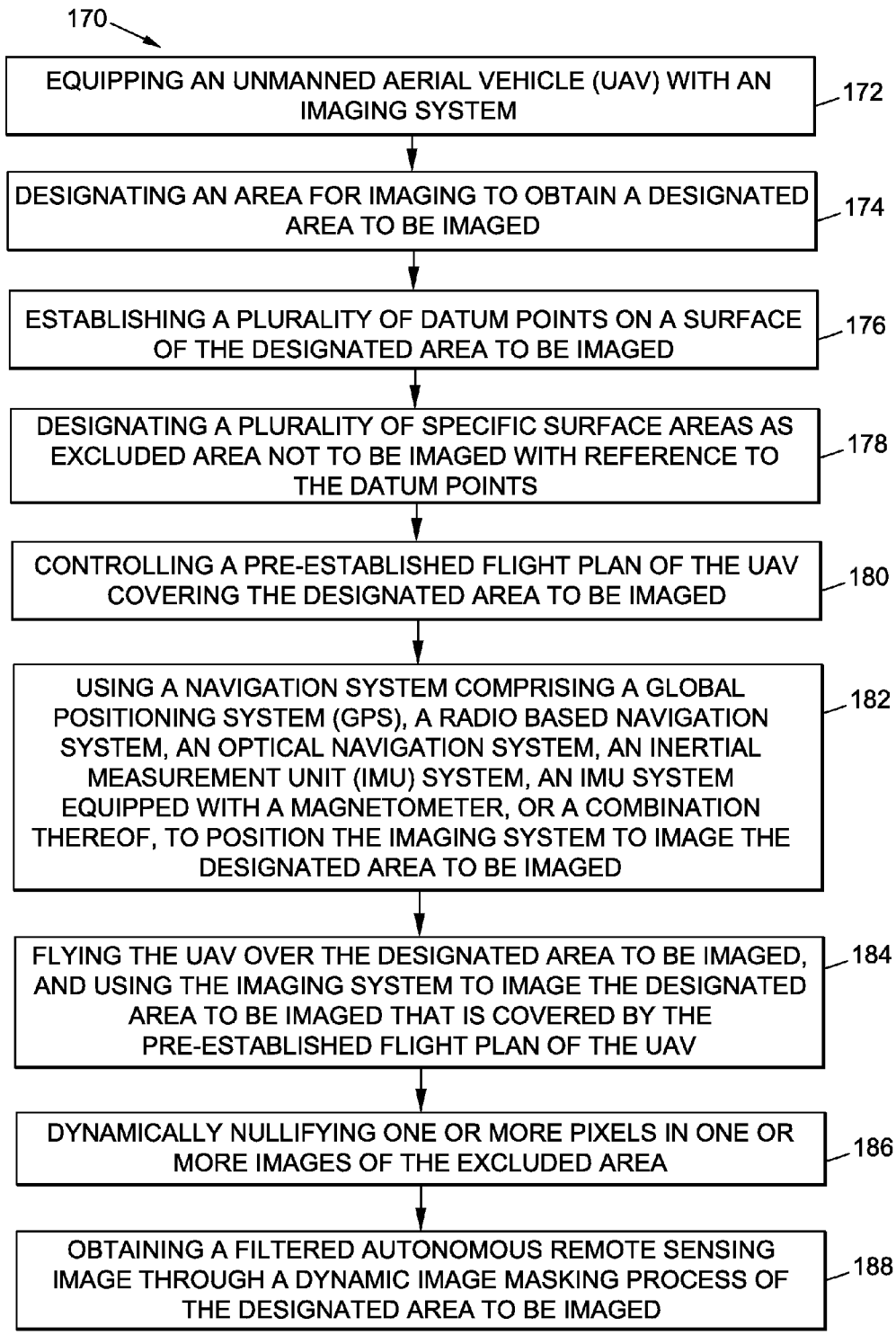
FIG. 5B is an illustration of a flow diagram of another embodiment of a method of the disclosure.

In another embodiment of the disclosure, there is provided a method 170 for (see FIG. 5B) providing a filtered autonomous remote sensing image 51 (see FIG. 4A) through a dynamic image masking process 11 (see FIG. 4B). FIG. 5B is an illustration of a flow diagram of another embodiment of the method 170 of the disclosure.

As shown in FIG. 5B, the method 170 comprises step 172 of equipping an unmanned aerial vehicle (UAV) 200 (see FIG. 6) with an imaging system 12 (see FIGS. 2, 4A).

As shown in FIG. 5B, the method 170 further comprises step 174 of designating an area for imaging 118 (see FIG. 4A) to obtain a designated area to be imaged 118a (see FIG. 4A).

As shown in FIG. 5B, the method 170 further comprises step 176 of establishing a plurality of datum points 120 (see FIG. 4A) on a surface 118b (see FIG. 4A) of the designated area to be imaged 118a (see FIG. 4A).

As shown in FIG. 5B, the method 170 further comprises step 178 of designating a plurality of specific surface areas 124a (see FIG. 4A) as excluded area 124 (see FIG. 4A) not to be imaged with reference to the plurality of datum points 120 (see FIG. 4A).

As shown in FIG. 5B, the method 170 further comprises step 180 of controlling a pre-established flight plan 17 (see FIG. 4A) of the UAV 200 (see FIG. 6) covering the designated area to be imaged 118a (see FIG. 4A).

As shown in FIG. 5B, the method 170 further comprises step 182 of using a navigation system 110 (see FIG. 4A) comprising a global positioning system (GPS) 110a (see FIG. 4A), a radio based navigation system 110b (see FIG. 4A), an optical based navigation system 110c (see FIG. 4A), an inertial measurement unit (IMU) system 110d (see FIG. 4A), an inertial measurement unit (IMU) system equipped with a magnetometer 110e (see FIG. 4A), or a combination thereof, to position the imaging system 12 (see FIGS. 2, 4A) to image the designated area to be imaged 118a (see FIG. 4A).

As shown in FIG. 5B, the method 170 further comprises step 184 of flying the UAV 200 (see FIG. 6) over the designated area to be imaged 118a (see FIG. 4A), and using the imaging system 12 (see FIGS. 2, 4A) to image the designated area to be imaged 118a (see FIG. 4A) that is covered by the pre-established flight plan 17 (see FIG. 4A) of the UAV 200 (see FIG. 6).

As shown in FIG. 5B, the method 170 further comprises step 186 of dynamically nullifying one or more pixels 126 (see FIG. 4B) in one or more images 122 (see FIG. 4A) of the excluded area 124 (see FIG. 4A). The step 186 of dynamically nullifying the one or more pixels 126 (see FIG. 4B) in one or more images 122 (see FIG. 4A) of the excluded area 124 (see FIG. 4A) comprises guiding the pre-established flight plan 17 (see FIG. 4A) of the UAV 200 (see FIG. 6) to avoid flying over the excluded area 124 (see FIG. 4A).

The step 186 of dynamically nullifying the one or more pixels 126 (see FIG. 4B) in the one or more images 122 (see FIG. 4A) of the excluded area 124 (see FIG. 4A) further comprises dynamic real time cancellation of imaging by the image sensing system 22 (see FIGS. 2, 4A) when the UAV 200 (see FIG. 6) flies over the excluded area 124 (see FIG. 4A).

The step 186 of dynamically nullifying the one or more pixels 126 (see FIG. 4B) in the one or more images 122 (see FIG. 4A) of the excluded area 124 (see FIG. 4A) further comprises altering one or more captured images 124b (see FIG. 4B) of the excluded area 124 (see FIG. 4A), making them undecipherable.

In one embodiment, the altering of the one or more captured images 124b (see FIG. 4A) of the excluded area 124 (see FIG. 4A) is preferably carried out in real time during imaging of the designated area to be imaged 118a (see FIG. 4A). In another embodiment, the altering of the one or more captured images 124b (see FIG. 4A) of the excluded area 124 (see FIG. 4A) is carried out after overall imaging of the designated area to be imaged 118a (see FIG. 4A) is completed, and before the filtered autonomous remote sensing image 51 (see FIGS. 2, 4A) is obtained through the dynamic image masking process 11 (see FIG. 4B) of the designated area to be imaged 118a (see FIG. 4A).

As shown in FIG. 5B, the method 170 further comprises step 188 of obtaining a filtered autonomous remote sensing image 51 (see FIGS. 2, 4A) through the dynamic image masking process 11 (see FIG. 5B) of the designated area to be imaged 118a (see FIG. 4A).

FIG. 6 is an illustration of a schematic representation of an embodiment of a remote sensing platform 14, such as airborne based platform 14a, in the form of an unmanned aerial vehicle (UAV) 200 that may be used in an embodiment of the dynamic image masking system 10, the method 150 (see FIG. 5A), and the method 170 (see FIG. 5B) of the disclosure. As shown in FIG. 6, the remote sensing platform 14, such as airborne based platform 14a, in the form of UAV 200, includes the dynamic image masking system 10. As further shown in FIG. 6, the UAV 200 comprises a nose 202, a fuselage 204, wings 206, and tail 208.

Figure 7:
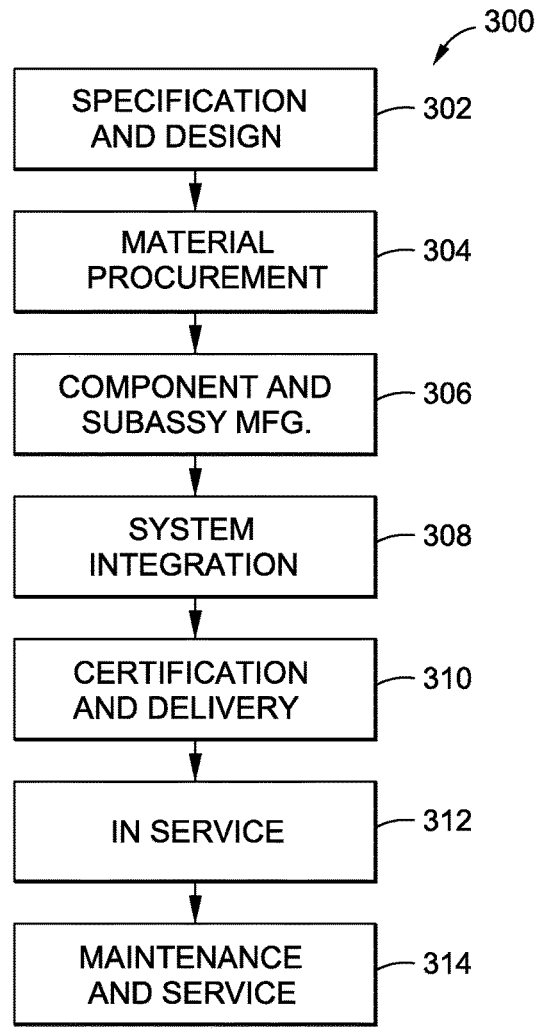
FIG. 7 is an illustration of a flow diagram of an embodiment of an aircraft manufacturing and service method.
Figure 8:
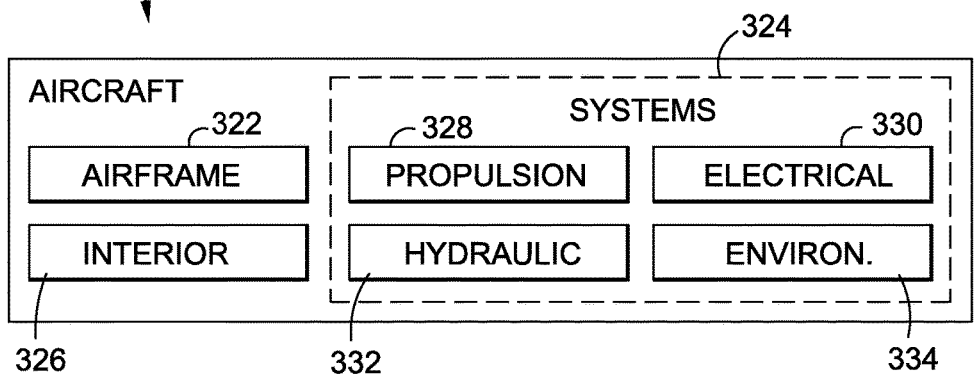
FIG. 8 is an illustration of a functional block diagram of an embodiment of an aircraft.

FIG. 7 is an illustration of a flow diagram of an embodiment of an aircraft manufacturing and service method 300. FIG. 8 is an illustration of a functional block diagram of an embodiment of an aircraft 320. Referring to FIGS. 7-8, embodiments of the disclosure may be described in the context of the aircraft manufacturing and service method 300, as shown in FIG. 7, and the aircraft 320, as shown in FIG. 8. During pre-production, the exemplary aircraft manufacturing and service method 300 (see FIG. 7) may include specification and design 302 (see FIG. 7) of the aircraft 316 (see FIG. 8) and material procurement 304 (see FIG. 7). During manufacturing, component and subassembly manufacturing 306 (see FIG. 7) and system integration 308 (see FIG. 7) of the aircraft 316 (see FIG. 8) takes place. Thereafter, the aircraft 316 (see FIG. 8) may go through certification and delivery 310 (see FIG. 7) in order to be placed in service 312 (see FIG. 7). While in service 312 (see FIG. 7) by a customer, the aircraft 316 (see FIG. 8) may be scheduled for routine maintenance and service 314 (see FIG. 7), which may also include modification, reconfiguration, refurbishment, and other suitable services.

Each of the processes of the aircraft manufacturing and service method 300 (see FIG. 7) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 8, the aircraft 320 produced by the exemplary aircraft manufacturing and service method 300 may include an airframe 322 with a plurality of systems 324 and an interior 326. As further shown in FIG. 8, examples of the systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 7). For example, components or subassemblies corresponding to component and subassembly manufacturing 306 (see FIG. 7) may be fabricated or manufactured in a manner similar to components or subassemblies produced while the aircraft 320 (see FIG. 8) is in service 312 (see FIG. 7). Also, one or more apparatus embodiments, method embodiments, or a combination thereof, may be utilized during component and subassembly manufacturing 306 (see FIG. 7 and system integration 308 (see FIG. 7), for example, by substantially expediting assembly of or reducing the cost of the aircraft 320 (see FIG. 8). Similarly, one or more of apparatus embodiments, method embodiments, or a combination thereof, may be utilized while the aircraft 320 (see FIG. 8) is in service 312 (see FIG. 7), for example and without limitation, to maintenance and service 312 (see FIG. 7).

Disclosed embodiments of the dynamic image masking system 10 (see FIGS. 2, 4A-4B), method 150 (see FIG. 5A), and method 170 (see FIG. 5B) provide numerous advantages over known systems and methods, including only imaging useful and desired data, as well as not imaging areas or data that are restricted, out of bounds, or out of context for remote sensing platform missions, such as airborne based platform missions. This sort of "guaranteed shutter control" addresses the invasion of privacy issues that may be of concern and ensures the dynamic image masking system 10 (see FIGS. 2, 4A-4B) is not overwhelmed by useless data, such as data collected over non-customer regions.

Moreover, disclosed embodiments of the dynamic image masking system 10 (see FIGS. 2, 4A-4B), method 150 (see FIG. 5A), and method 170 (see FIG. 5B) provide for well defined collect zones for imagery collection, and provide for autonomous operations, which are typically required for aerial remote sensing imagery collection in the full precision agriculture market, such as flying over croplands to determine plant health and vigor. Further, disclosed embodiments of the dynamic image masking system 10 (see FIGS. 2, 4A-4B), method 150 (see FIG. 5A), and method 170 (see FIG. 5B) integrate the imaging system 12 (see FIGS. 2, 4A) and the autopilot of a remote sensing platform 14, such as an unmanned aerial vehicle (UAV) 200 (see FIG. 6), and may perform flight and shutter control operations for multiple UAVs 200 simultaneously.

In addition, disclosed embodiments of the dynamic image masking system 10 (see FIGS. 2, 4A-4B), method 150 (see FIG. 5A), and method 170 (see FIG. 5B) produce a reliable, repeatable masked image 50 (see FIGS. 2, 4A) product that preferably results in a product set with only the pixels 126 (see FIG. 4B) of interest getting utilized. The pixels 126 (see FIG. 4B) may either not be collected, blanked out, overwritten, saturated with light, or otherwise altered, so as to render the pixels 126 (see FIG. 4B) useless in the product generation process. And this may occur anywhere in the product generation process, from being "blanked out" in the collection planning phase 112 (see FIG. 4A), to being overwritten in the collection phase 114 (see FIG. 4A), to being post processed in the post processing phase 116 (see FIG. 4A) after the one or more images 122 (see FIG. 4A) are collected.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A dynamic image masking system for providing a filtered autonomous remote sensing image through a dynamic image masking process, the system comprising:
   a remote sensing platform;
   an imaging system associated with the remote sensing platform, the imaging system comprising:
      an optical system comprising a camera or a sensor, that outputs raw image data obtained with the optical system;
      an image sensing system that receives the raw image data from the optical system, the image sensing system comprising a focal plane array subsystem;
   a multi-level security system associated with the imaging system;
   one or more image alteration locations located in the imaging system and the multi-level security system, wherein alteration of one or more images takes place via the dynamic image masking process;
   an optical blindness system located between the optical system and the image sensing system, the optical blindness system configured to output masked raw image data to a focal plane array of the focal plane array subsystem, wherein the optical blindness system controls an image alteration location located between the optical system and the image sensing system, the optical blindness system comprising a shutter control mechanical device to inhibit one or more pixels from collecting photons, or comprising a laser and micromirrors optical device to illuminate one or more pixels, causing blindness of the one or more pixels; and
   a computer system associated with the imaging system, the computer system comprising a gatekeeper algorithm configured to send gatekeeper commands to a plurality of controllers that control the one or more image alteration locations through the dynamic image masking process, the plurality of controllers comprising the optical blindness system, a pixel controller, a digitization controller, a digital flow controller, a control storage controller, and an analog signal controller, the gatekeeper algorithm configured to calculate where a pixel is coming from and to determine if the pixel is in an area for imaging.

2. The dynamic image masking system of claim 1, further comprising a navigation system comprising a global positioning system (GPS), a radio based navigation system, an optical based navigation system, an inertial measurement unit (IMU) system, an inertial measurement unit (IMU) system equipped with a magnetometer, or a combination thereof, to position the imaging system to image a designated area to be imaged.

3. The dynamic image masking system of claim 1, wherein the remote sensing platform comprises an airborne based platform, a ground based platform, a space based platform, or a water based platform.

4. The dynamic image masking system of claim 1, wherein the camera comprises a digital camera, and wherein the image sensing system further comprises a radar imaging system, a sonar imaging system, an infrared imaging system, an x-ray imaging system, or a light detection and ranging (LIDAR) system.

5. The dynamic image masking system of claim 1, wherein the gatekeeper algorithm is further configured to send a gatekeeper command to a pre-established collection planning process at an image alteration location at the located pre-established collection planning process before input to the imaging system, by determining excluded area not to be imaged with the imaging system.

6. The dynamic image masking system of claim 1, wherein the gatekeeper algorithm is configured to send a gatekeeper command either mechanically or optically to the optical blindness system that controls the image alteration location located between the optical system and the image sensing system, wherein the optical blindness system processes no extraneous pixels as the pixels are altered before registering on the focal plane array of the image sensing system.

7. The dynamic image masking system of claim 1, wherein the focal plane array subsystem comprising:
   a focal plane array that reads raw image data from the optical system and reads masked raw image data from the optical blindness system;
   an analog to digital converter that receives the raw image data from the focal plane array and converts the raw image data from analog to digital signals, and that receives the masked raw image date from the focal plane array via use of the gatekeeper algorithm and the pixel controller;
   a volatile temporary storage that receives the digital signals from the analog to digital converter and temporarily stores the digital signals, and that receives a masked analog to digital converter output from the analog to digital converter via use of the gatekeeper algorithm and the digitization controller;
   a digital signal processor that receives the digital signals from the volatile temporary storage and processes the digital signals to a readable image format, and that receives a masked volatile temporary storage output from the volatile temporary storage via use of the gatekeeper algorithm and the digital flow controller; and,
   when the imaging system uses analog output, a digital to analog converter that receives readable digital signals from the digital signal processor and converts the readable digital signals to analog signals.

8. The dynamic image masking system of claim 7, wherein the gatekeeper algorithm is configured to send a gatekeeper command to the pixel controller that controls an image alteration location at the focal plane array, by overwriting one or more pixels on the focal plane array with either zero saturation or one hundred percent saturation.

9. The dynamic image masking system of claim 7, wherein the gatekeeper algorithm is configured to send a gatekeeper command to the digitization controller that controls an image alteration location located between the analog to digital converter and the volatile temporary storage, by setting a digitized value for one or more pixels of either a minimum value or a maximum value.

10. The dynamic image masking system of claim 7, wherein the gatekeeper algorithm is configured to send a gatekeeper command to the digital flow controller that controls an image alteration location located between the volatile temporary storage and the digital signal processor, by altering a single image at a time and masking one or more pixels in the single image.

11. The dynamic image masking system of claim 7, wherein the gatekeeper algorithm is configured to send a gatekeeper command to the control storage controller that controls an image alteration location located at a digital signal processor output of the focal plane array subsystem and before input to a non-volatile resultant storage of the multi-level security system, by masking one or more pixels so that they are not written to the non-volatile resultant storage.

12. The dynamic image masking system of claim 7, wherein the gatekeeper algorithm is configured to send a gatekeeper command to the analog signal controller that controls an image alteration location located at a digital to analog converter output of the focal plane array subsystem and before input to a video editing system, by masking one or more pixels so that they are not written to the video editing system.

13. The dynamic image masking system of claim 1, wherein the gatekeeper algorithm is configured to send a gatekeeper command that controls an image alteration location located in the multi-level security system between a non-volatile resultant storage and a post processing process, by overwriting one or more pixels with either zero saturation or one hundred percent saturation.

14. The dynamic image masking system of claim 1, wherein the gatekeeper algorithm is configured to send a gatekeeper command that controls an image alteration location at a post processing process of the multi-level security system, by editing or ignoring one or more pixels representing excluded area of a designated area to be imaged.

15. A method for providing a filtered autonomous remote sensing image through a dynamic image masking process, the method comprising the steps of:
equipping a remote sensing platform with an imaging system, the imaging system comprising:
an optical system comprising a camera or a sensor, that outputs raw image data obtained with the optical system;
an image sensing system that receives the raw image data from the optical system, the image sensing system comprising a focal plane array subsystem;
an optical blindness system located between the optical system and the image sensing system, the optical blindness system configured to output masked raw image data to a focal plane array of the focal plane array subsystem, wherein the optical blindness system controls an image alteration location located between the optical system and the image sensing system, the optical blindness system comprising a shutter control mechanical device to inhibit one or more pixels from collecting photons, or comprising a laser and micro-mirrors optical device to illuminate one or more pixels, causing blindness of the one or more pixels; and
a computer system associated with the imaging system, the computer system comprising a gatekeeper algorithm configured to send gatekeeper commands to a plurality of controllers that control the one or more image alteration locations through the dynamic image masking process, the plurality of controllers comprising the optical blindness system, a pixel controller, a digitization controller, a digital flow controller, a control storage controller, and an analog signal controller, the gatekeeper algorithm configured to calculate where a pixel is coming from and to determine if the pixel is in an area for imaging;
designating an area for imaging to obtain a designated area to be imaged;
establishing a plurality of datum points on a surface of the designated area to be imaged;
designating a plurality of specific surface areas as excluded area not to be imaged with reference to the plurality of datum points;
controlling a pre-established collection planning process covering the designated area to be imaged;
using a navigation system comprising a global positioning system (GPS), a radio based navigation system, an optical based navigation system, an inertial measurement unit (IMU) system, an inertial measurement unit (IMU) system equipped with a magnetometer, or a combination thereof, to position the imaging system to image the designated area to be imaged;
using the imaging system to image the designated area to be imaged that is covered by the pre-established collection planning process;
dynamically nullifying one or more pixels in one or more images of the excluded area; and
obtaining a filtered autonomous remote sensing image through the dynamic image masking process of the designated area to be imaged.

16. The method of claim 15 wherein the step of equipping the remote sensing platform with the imaging system comprises equipping the remote sensing platform with the imaging system comprising the optical system including a digital camera, and the image sensing system further comprising a radar imaging system, a sonar imaging system, an infrared imaging system, an x-ray imaging system, or a light detection and ranging (LIDAR) system.

17. The method of claim 15 wherein the step of equipping the remote sensing platform with the imaging system comprises equipping the remote sensing platform comprising an airborne based platform, a ground based platform, a space based platform, or a water based platform.

18. The method of claim 15, wherein the step of dynamically nullifying the one or more pixels from the one or more images of the excluded area comprises altering one or more captured images of the excluded area, making them indecipherable.

19. The method of claim 18, wherein the altering of the one or more captured images of the excluded area is carried out in real time during imaging of the designated area to be imaged.

20. A method for providing a filtered autonomous remote sensing image through a dynamic image masking process, the method comprising the steps of:

equipping an unmanned aerial vehicle (UAV) with an imaging system, the imaging system comprising:
  an optical system comprising a camera or a sensor, that outputs raw image data obtained with the optical system;
  an image sensing system that receives the raw image data from the optical system, the image sensing system comprising a focal plane array subsystem;
  an optical blindness system located between the optical system and the image sensing system, the optical blindness system configured to output masked raw image data to a focal plane array of the focal plane array subsystem, wherein the optical blindness system controls an image alteration location located between the optical system and the image sensing system, the optical blindness system comprising a shutter control mechanical device to inhibit one or more pixels from collecting photons, or comprising a laser and micro-mirrors optical device to illuminate one or more pixels, causing blindness of the one or more pixels; and
  a computer system associated with the imaging system, the computer system comprising a gatekeeper algorithm configured to send gatekeeper commands to a plurality of controllers that control the one or more image alteration locations through the dynamic image masking process, the plurality of controllers comprising the optical blindness system, a pixel controller, a digitization controller, a digital flow controller, a control storage controller, and an analog signal controller;
designating an area for imaging to obtain a designated area to be imaged;
establishing a plurality of datum points on a surface of the designated area to be imaged;
designating a plurality of specific surface areas as excluded area not to be imaged with reference to the plurality of datum points;
controlling a pre-established flight plan of the UAV covering the designated area to be imaged;
using a navigation system comprising a global positioning system (GPS), a radio based navigation system, an optical based navigation system, an inertial measurement unit (IMU) system, an inertial measurement unit (IMU) system equipped with a magnetometer, or a combination thereof, to position the imaging system to image the designated area to be imaged;
flying the UAV over the designated area to be imaged, and using the imaging system to image the designated area to be imaged that is covered by the pre-established flight plan of the UAV;
dynamically nullifying one or more pixels in one or more images of the excluded area; and
obtaining a filtered autonomous remote sensing image through the dynamic image masking process of the designated area to be imaged.

21. The method of claim 20, wherein the step of dynamically nullifying the one or more pixels in one or more images of the excluded area comprises guiding the pre-established flight plan of the UAV to avoid flying over the excluded area.

22. The method of claim 20, wherein the step of dynamically nullifying the one or more pixels from one or more images of the excluded area comprises dynamic real time cancellation of imaging by the image sensing system when the UAV flies over the excluded area.

23. The method of claim 20, wherein the step of dynamically nullifying the one or more pixels from the one or more images of the excluded area comprises altering one or more captured images of the excluded area, making them undecipherable.

24. The method of claim 23, wherein the altering of the one or more captured images of the excluded area is carried out in real time during imaging of the designated area to be imaged.

25. The method of claim 23, wherein the altering of the one or more captured images of the excluded areas is carried out after overall imaging of the designated area to be imaged is completed, and before the filtered autonomous remote sensing image is obtained through the dynamic image masking process of the designated area to be imaged.

* * * * *